US012596889B2

(12) United States Patent
Mallick et al.

(10) Patent No.: US 12,596,889 B2
(45) Date of Patent: Apr. 7, 2026

(54) GENERATION OF NATURAL LANGUAGE (NL) BASED SUMMARIES USING A LARGE LANGUAGE MODEL (LLM) AND SUBSEQUENT MODIFICATION THEREOF FOR ATTRIBUTION

(71) Applicant: GOOGLE LLC, Mountain View, CA (US)

(72) Inventors: Shrestha Basu Mallick, San Francisco, CA (US); Owen Lewis, Stanford, CA (US); Jaclyn Konzelmann, Mountain View, CA (US); Christina Yang Choi, San Jose, CA (US); James Freedman, Los Angeles, CA (US); Jonathan Malmaud, Campbell, CA (US); Xin Xie, San Jose, CA (US); Brian Carver, Emeryville, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/675,840

(22) Filed: May 28, 2024

(65) Prior Publication Data

US 2024/0320445 A1      Sep. 26, 2024

Related U.S. Application Data

(63) Continuation of application No. 18/241,731, filed on Sep. 1, 2023, now abandoned.
(Continued)

(51) Int. Cl.
*G06F 40/40* (2020.01)
(52) U.S. Cl.
CPC ................................... *G06F 40/40* (2020.01)

(58) Field of Classification Search
CPC ............. G06F 16/3329; G06F 16/3344; G06F 16/367; G06F 40/30; G06F 18/214;
(Continued)

(56) References Cited

U.S. PATENT DOCUMENTS

| | | |
|---|---|---|
| 11,704,351 B1 | 7/2023 | Soleimani |
| 11,763,069 B2 | 9/2023 | Makino |

(Continued)

OTHER PUBLICATIONS

Gao, L. et al., "RARR: Researching and Revising What Language Models Say, Using Language Models"; Proceedings of the 61st Annual Meeting of The Association for Computational Linguistics (vol. 1: Long Papers); retrieved from the internet: https: arxiv.org/pdf/2210.08726v2.pdf; 30 pages; dated Dec. 4, 2022.
(Continued)

*Primary Examiner* — Abdelali Serrou
(74) *Attorney, Agent, or Firm* — Gray Ice Higdon

(57) ABSTRACT

Implementations described herein relate to attribution of a natural language (NL) based summary generated using a large language model (LLM). Processor(s) of a system can: receive NL based input associated with a client device, generate the NL based summary using the LLM, and process the NL based summary to determine whether a NL based summary segment of the NL based summary matches a dataset segment of a dataset that was utilized to initially train the LLM and/or to fine-tune the LLM. Further, the processor(s) can, in response to determining that the NL based summary segment matches the dataset segment, modify the NL based summary segment of the NL based summary to generate a modified NL based summary. Moreover, the processor(s) can cause the modified NL based summary to be rendered at the client device. The attribution of the NL based summary can be provided as a service to various third-parties.

20 Claims, 11 Drawing Sheets

Related U.S. Application Data

(60) Provisional application No. 63/447,234, filed on Feb. 21, 2023.

(58) Field of Classification Search
CPC .......... G06F 40/40; G06F 21/32; G06F 18/22; G06F 16/532; G06F 40/295; G06F 16/35; G06F 40/284; G06F 40/35; G06F 40/20; G06F 40/216; G06F 16/335; G06F 16/338; G06F 16/243; G06F 40/279; G06F 40/289; G06F 16/334; G06F 16/9535; G06F 18/253; G06F 16/345; G06F 16/90332; G06F 18/241; G06F 18/2431; G06F 18/25; G06F 16/31; G06F 18/24; G06F 30/27; G06F 40/186; G06F 16/33; G06F 16/951; G06F 40/205; G06F 16/29; G06F 16/3334; G06F 16/3347; G06F 16/9024; G06F 18/217; G06F 3/0481; G06F 40/16; G06F 40/211; G06F 40/58; G06F 16/248; G06F 16/332; G06F 16/34; G06F 16/5846; G06F 16/9537; G06F 18/256; G06F 40/166; G06F 40/194; G06F 16/2282; G06F 16/2433; G06F 16/353; G06F 16/90335; G06F 16/9538; G06F 18/23213; G06F 40/126; G06F 16/22; G06F 16/24522; G06F 16/2455; G06F 16/285; G06F 16/3331; G06F 16/3335; G06F 16/432; G06F 16/483; G06F 16/58; G06F 16/783; G06F 16/9032; G06F 16/9038; G06F 18/213; G06F 18/2415; G06F 21/552; G06F 21/6245; G06F 2221/034; G06F 3/011; G06F 3/04842; G06F 3/167; G06F 30/13; G06F 40/103; G06F 40/174; G06F 40/242; G06F 40/247; G06F 40/56; G06F 9/451; G06F 11/3692; G06F 16/16; G06F 16/215; G06F 16/23; G06F 16/24564; G06F 16/2468; G06F 16/283; G06F 16/288; G06F 16/3326; G06F 16/3332; G06F 16/3343; G06F 16/435; G06F 16/51; G06F 16/535; G06F 16/54; G06F 16/5866; G06F 16/735; G06F 16/75; G06F 16/78; G06F 16/7867; G06F 16/901; G06F 16/90344; G06F 16/9035; G06F 16/904; G06F 18/10; G06F 18/20; G06F 18/2411; G06F 18/27; G06F 18/28; G06F 18/285; G06F 21/10; G06F 21/565; G06F 21/577; G06F 3/01; G06F 3/012; G06F 3/013; G06F 3/017; G06F 3/0482; G06F 3/0484; G06F 40/151; G06F 40/177; G06F 40/274; G06F 8/65; G06F 9/445; G06F 9/46; G06F 9/5044; G06F 11/3428; G06F 11/3608; G06F 11/3684; G06F 11/3688; G06F 16/211; G06F 16/2228; G06F 16/242; G06F 16/2453; G06F 16/24534; G06F 16/2474; G06F 16/252; G06F 16/284; G06F 16/287; G06F 16/313; G06F 16/316; G06F 16/322; G06F 16/3338; G06F 16/3346; G06F 16/374; G06F 16/38; G06F 16/383; G06F 16/43; G06F 16/438; G06F 16/53; G06F 16/55; G06F 16/683; G06F 16/903; G06F 16/90328; G06F 16/906; G06F 16/909; G06F 16/953; G06F 16/9532; G06F 16/955; G06F 16/9558; G06F 16/958; G06F 17/16; G06F 18/23; G06F 18/24147; G06F 18/26; G06F 18/40; G06F 21/56; G06F 21/563; G06F 21/564; G06F 21/6218; G06F 21/6254; G06F 21/64; G06F 2123/02; G06F 2207/4824; G06F 30/10; G06F 30/12; G06F 40/106; G06F 40/169; G06F 40/18; G06F 40/226; G06F 5/01; G06F 7/5443; G06F 8/31; G06F 8/37; G06F 8/38; G06F 8/41; G06F 8/70; G06F 8/73; G06F 9/453; G06F 9/5016; G06F 9/5055; G06F 9/5072; G06F 9/542; G10L 15/08; G10L 15/25; G10L 13/02; G10L 15/22; G10L 15/16; G10L 2015/088; G10L 15/20; G10L 17/18; G10L 2015/223; G10L 17/04; G10L 13/00; G10L 13/027; G10L 17/02; G10L 17/10; G10L 25/84; G10L 15/26; G10L 15/02; G10L 17/06; G10L 17/24; G10L 15/063; G10L 15/183; G10L 25/63; G10L 25/51; G10L 17/22; G10L 25/30; G10L 13/04; G10L 13/08; G10L 15/187; G10L 15/197; G10L 15/28; G10L 17/00; G10L 17/14; G10L 19/022; G10L 2015/025; G10L 2015/225; G10L 2015/226; G10L 25/03; G10L 25/87
See application file for complete search history.

(56) References Cited

U.S. PATENT DOCUMENTS

| | | | | |
|---|---|---|---|---|
| 12,046,155 | B1 * | 7/2024 | Ghosh | G06F 40/30 |
| 2018/0113922 | A1 | 4/2018 | Gulwani | |
| 2019/0325066 | A1 | 10/2019 | Krishna | |
| 2021/0295822 | A1 * | 9/2021 | Tomkins | G10L 15/197 |
| 2021/0374338 | A1 * | 12/2021 | Shrivastava | G06F 40/30 |
| 2022/0269853 | A1 * | 8/2022 | Itani | G06F 40/205 |
| 2022/0318522 | A1 * | 10/2022 | Wolf | G06N 3/09 |
| 2023/0020886 | A1 | 1/2023 | Mahapatra | |
| 2024/0185001 | A1 * | 6/2024 | Nagaraju | G06F 40/284 |
| 2024/0281668 | A1 * | 8/2024 | Lev | G06F 40/35 |

OTHER PUBLICATIONS

Dunn, A. et al., "Structured information extraction from complex scientific text with fine-tuned large language models"; arXiv.org., Cornell University; arXiv.2212.05238v1; 21 pages; dated Dec. 10, 2022.

Chung, H.W. et al., "Scaling Instruction-Finetuned Language Models"; arXiv.org, Cornell University; arXiv:2210.11416v5; 54 pages; dated Dec. 6, 2022.

European Patent Office; International Search Report and Written Opinion issued in Application No. PCT/US2023/034690; 13 pages; dated Feb. 5, 2024.

* cited by examiner

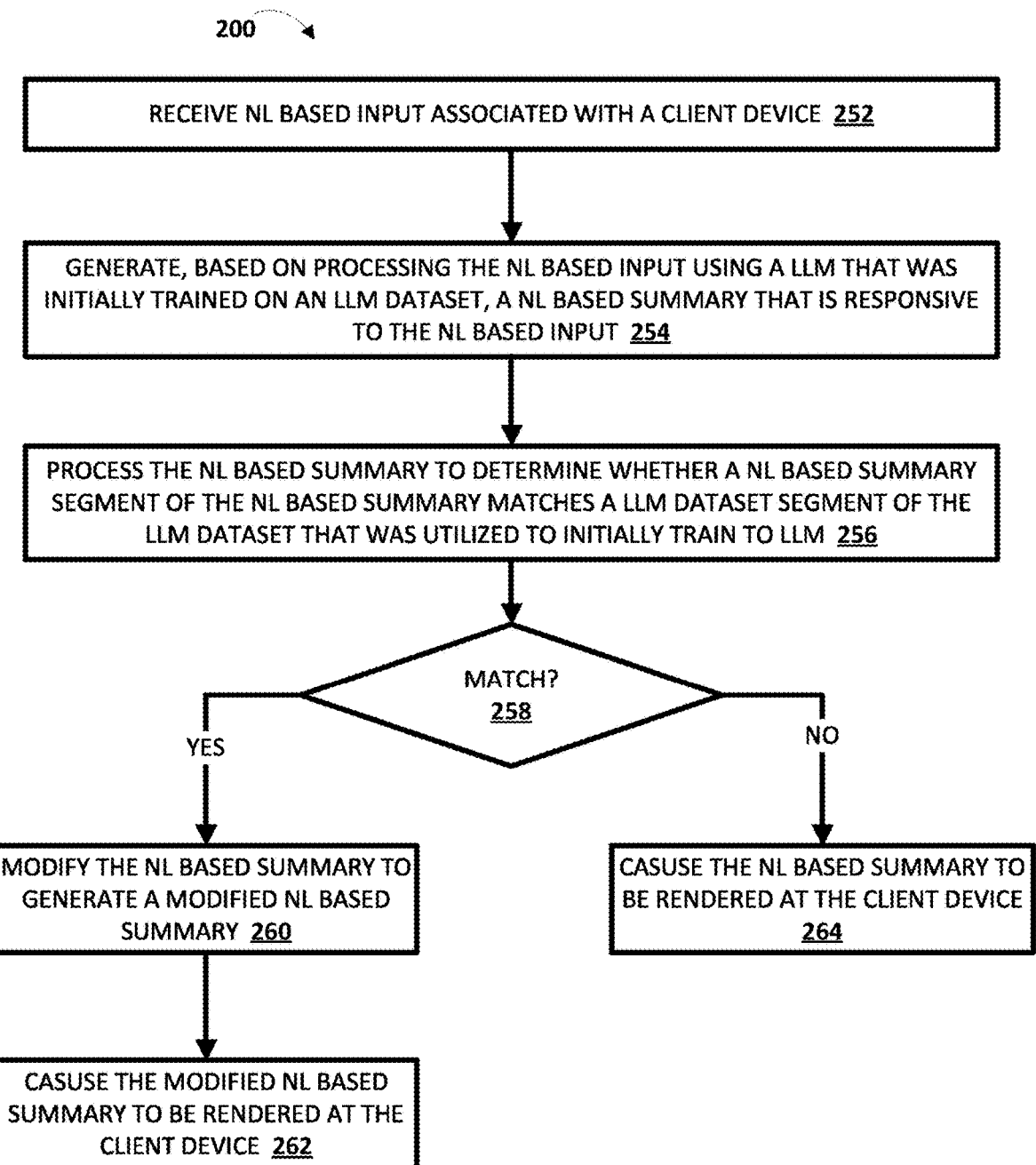

200

RECEIVE NL BASED INPUT ASSOCIATED WITH A CLIENT DEVICE 252

GENERATE, BASED ON PROCESSING THE NL BASED INPUT USING A LLM THAT WAS INITIALLY TRAINED ON AN LLM DATASET, A NL BASED SUMMARY THAT IS RESPONSIVE TO THE NL BASED INPUT 254

PROCESS THE NL BASED SUMMARY TO DETERMINE WHETHER A NL BASED SUMMARY SEGMENT OF THE NL BASED SUMMARY MATCHES A LLM DATASET SEGMENT OF THE LLM DATASET THAT WAS UTILIZED TO INITIALLY TRAIN TO LLM 256

MATCH? 258

YES

NO

MODIFY THE NL BASED SUMMARY TO GENERATE A MODIFIED NL BASED SUMMARY 260

CASUSE THE NL BASED SUMMARY TO BE RENDERED AT THE CLIENT DEVICE 264

CASUSE THE MODIFIED NL BASED SUMMARY TO BE RENDERED AT THE CLIENT DEVICE 262

FIG. 2

300

NORMALIZE A DATASET THAT WAS UTILIZED TO INITIALLY TRAIN A LLM AND/OR FINE-TUNE THE LLM 352

CONVERT ALL CAPITALIZED ALPHANUMERIC CHARACTERS IN THE DATASET INTO LOWERCASE ALPHANUMERIC CHARACTERS 352A

CONVERT ALL PUNCTUATION IN THE DATASET INTO SINGLE SPACES 352B

CONVERT ALL WHITE SPACES IN THE DATASET INTO SINGLE SPACES 352C

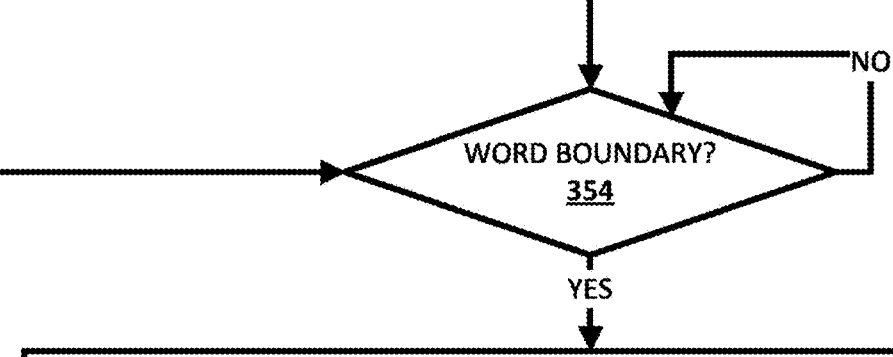

NO

WORD BOUNDARY?
354

YES

IDENTIFY A FIXED NUMBER OF ALPHANUMERIC CHARACTERS STARTING AT THE WORD BOUNDARY OR A FIXED NUMBER OF WORDS STARTING AT THE WORD BOUNDARY 356

STORE A GIVEN DATASET ALPHANUMERIC SEGMENT IN AN INDEX, THE GIVEN DATASET ALPHANUMERIC SEGMENT INCLUDING THE FIXED NUMBER OF ALPHANUMERIC CHARACTERS STARTING AT THE WORD BOUNDARY OR THE FIXED NUMBER OF WORDS STARTING AT THE WORD BOUNDARY 358

STORE METADATA THAT IDENTIFIES SOURCE(S) OF CONTENT CAPTURED IN THE GIVEN DATASET ALPHANUMERIC SEGMENT IN ASSOCIATION WITH THE GIVEN DATASET ALPHANUMERIC SEGMENT IN THE INDEX 358A

FIG. 3

400

NORMALIZE A NL BASED SUMMARY THAT WAS GENERATED USING A LLM AND/OR A FINE-TUNED LLM 452

> CONVERT ALL CAPITALIZED ALPHANUMERIC CHARACTERS IN THE NL BASED SUMMARY INTO LOWERCASE ALPHANUMERIC CHARACTERS 452A

> CONVERT ALL PUNCTUATION IN THE NL BASED SUMMARY INTO SINGLE SPACES 452B

> CONVERT ALL WHITE SPACES IN THE NL BASED SUMMARY INTO SINGLE SPACES 452C

WORD BOUNDARY? 454 — NO

YES

IDENTIFY A FIXED NUMBER OF ALPHANUMERIC CHARACTERS STARTING AT THE WORD BOUNDARY OR A FIXED NUMBER OF WORDS STARTING AT THE WORD BOUNDARY 456

COMPARE THE FIXED NUMBER OF ALPHANUMERIC CHARACTERS STARTING AT THE WORD BOUNDARY OR THE FIXED NUMBER OF WORDS STARTING AT THE WORD BOUNDARY TO A PLURALITY OF DATASET ALPHANUMERIC SEGMENTS FOR A DATASET THAT WAS UTILIZED TO INITIALLY TRAIN THE LLM AND/OR TO FINE-TUNE THE LLM 458

MATCH? 460 — NO

YES

OBTAIN, FROM AN INDEX, METADATA THAT IDENTIFIES SOURCE(S) OF CONTENT CAPTURED IN A GIVEN DATASET ALPHANUMERIC SEGMENT AND THAT IS STORED IN ASSOCIATION WITH THE GIVEN DATASET ALPHANUMERIC SEGMENT THAT MATCHES THE FIXED NUMBER OF ALPHANUMERIC CHARACTERS STARTING AT THE WORD BOUNDARY OR THE FIXED NUMBER OF WORDS STARTING AT THE WORD BOUNDARY 462

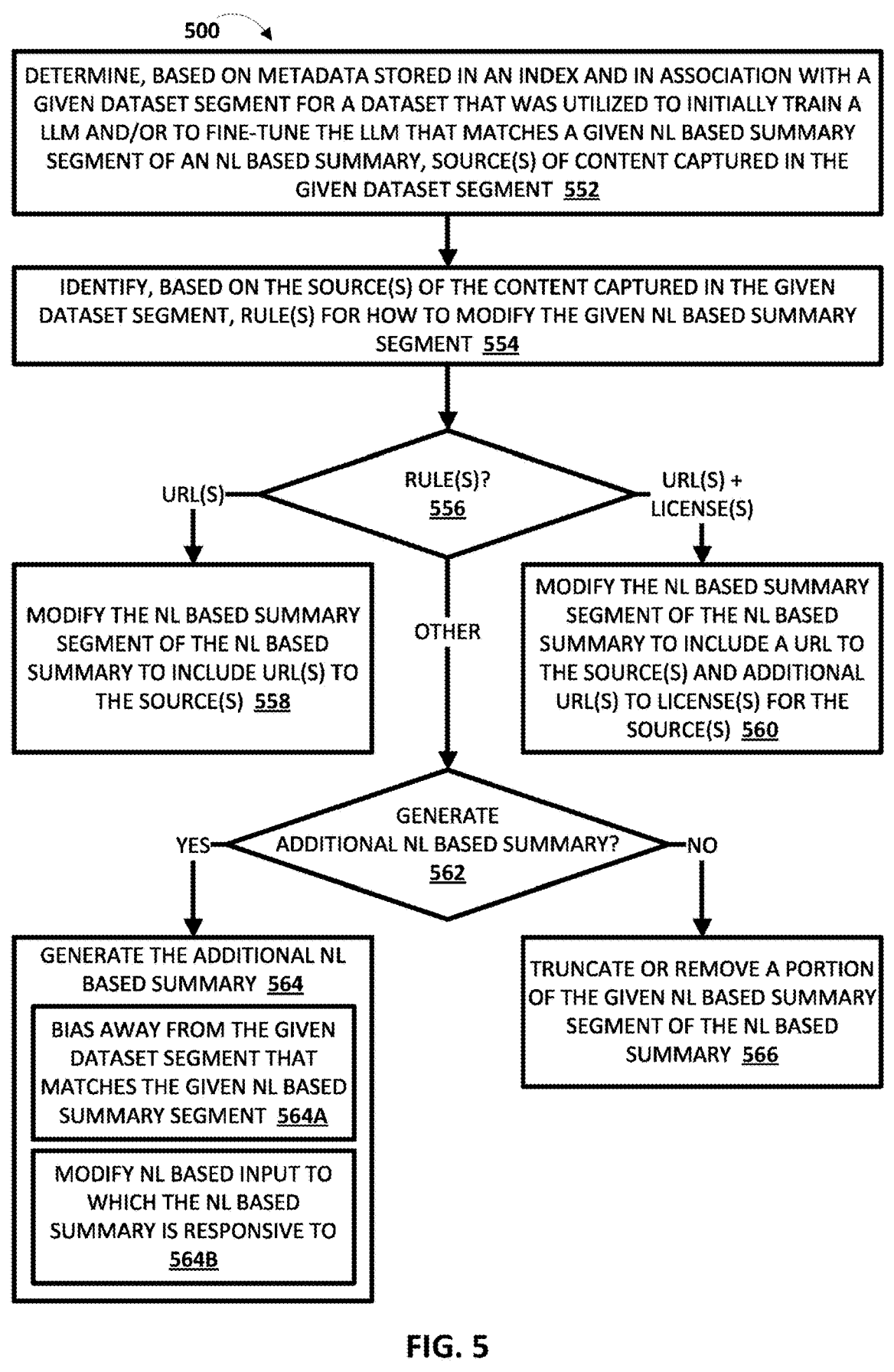

DETERMINE, BASED ON METADATA STORED IN AN INDEX AND IN ASSOCIATION WITH A GIVEN DATASET SEGMENT FOR A DATASET THAT WAS UTILIZED TO INITIALLY TRAIN A LLM AND/OR TO FINE-TUNE THE LLM THAT MATCHES A GIVEN NL BASED SUMMARY SEGMENT OF AN NL BASED SUMMARY, SOURCE(S) OF CONTENT CAPTURED IN THE GIVEN DATASET SEGMENT 552

IDENTIFY, BASED ON THE SOURCE(S) OF THE CONTENT CAPTURED IN THE GIVEN DATASET SEGMENT, RULE(S) FOR HOW TO MODIFY THE GIVEN NL BASED SUMMARY SEGMENT 554

RULE(S)? 556

URL(S)

URL(S) + LICENSE(S)

OTHER

MODIFY THE NL BASED SUMMARY SEGMENT OF THE NL BASED SUMMARY TO INCLUDE URL(S) TO THE SOURCE(S) 558

MODIFY THE NL BASED SUMMARY SEGMENT OF THE NL BASED SUMMARY TO INCLUDE A URL TO THE SOURCE(S) AND ADDITIONAL URL(S) TO LICENSE(S) FOR THE SOURCE(S) 560

GENERATE ADDITIONAL NL BASED SUMMARY? 562

YES

NO

GENERATE THE ADDITIONAL NL BASED SUMMARY 564

BIAS AWAY FROM THE GIVEN DATASET SEGMENT THAT MATCHES THE GIVEN NL BASED SUMMARY SEGMENT 564A

MODIFY NL BASED INPUT TO WHICH THE NL BASED SUMMARY IS RESPONSIVE TO 564B

TRUNCATE OR REMOVE A PORTION OF THE GIVEN NL BASED SUMMARY SEGMENT OF THE NL BASED SUMMARY 566

FIG. 5

GENERATION OF NATURAL LANGUAGE (NL) BASED SUMMARIES USING A LARGE LANGUAGE MODEL (LLM) AND SUBSEQUENT MODIFICATION THEREOF FOR ATTRIBUTION

BACKGROUND

Large language models (LLMs) are particular types of machine learning models that can perform various natural language processing (NLP) tasks, such as language generation, machine translation, and question-answering. These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based query or prompt that is received from a client device, and generate a NL based response that is responsive to the NL based query or prompt and that is to be rendered at the client device. In generating the NL based response, these LLMs can inadvertently include content captured in the underlying data on which they were trained as a result of various factors. However, these LLMs are not designed to attribute this inadvertently included content to sources of the underlying data on which they were trained. Accordingly, there is a need in the art for new system(s) capable of attributing this inadvertently included content to the sources thereof.

SUMMARY

Implementations described herein relate to attribution of a natural language (NL) based summary generated using a large language model (LLM). Processor(s) of a system can: receive NL based input associated with a client device, generate the NL based summary that is responsive to the NL based input based on processing the NL based input using the LLM, and process the NL based summary to determine whether a NL based summary segment of the NL based summary matches a dataset segment of a dataset that was utilized to initially train the LLM and/or to fine-tune the LLM. Further, the processor(s) can, in response to determining that the NL based summary segment matches the dataset segment, modify the NL based summary segment of the NL based summary to generate a modified NL based summary that is also responsive to the NL based input. Moreover, the processor(s) can cause the modified NL based summary to be rendered at the client device.

In some implementations, the dataset is an LLM dataset that was utilized to initially train the LLM. For example, prior to receiving the NL based input, the LLM dataset that was utilized to initially train the LLM can be normalized, segmented, and stored in an index in association with source(s) of respective portions of data included in the LLM dataset. Accordingly, when the NL based summary is generated based on processing the NL based input using the LLM, the NL based summary can also be normalized and segmented to enable the processor(s) to determine whether a NL based summary segment of the NL based summary matches a LLM dataset segment of the LLM dataset that was utilized to initially train the LLM by comparing various NL based summary segments of the NL based summary to the LLM dataset segments that are stored in the index.

In this example, and in response to the processor(s) determining that a NL based summary segment of the NL based summary matches a LLM dataset segment of the LLM dataset that was utilized to initially train the LLM, the source(s) stored in association with the LLM dataset segment that match the NL based summary segment can be quickly and efficiently identified. Moreover, and based on rule(s) associated with the source(s) stored in association with the LLM dataset segment that match the NL based summary segment, the NL based summary can be modified to reflect attribution(s) of the source(s) to the NL based summary segment in certain situations. Notably, these rule(s) are described in more detail herein and can vary based on the source(s) and/or a type of the source(s) associated with the LLM dataset segment.

In additional or alternative implementations, the dataset is a third-party dataset that was utilized to fine-tune the LLM. In some versions of those implementations, the third-party dataset can be received from a third-party and the processor(s) can fine-tune the LLM using the third-party dataset and on behalf of the third-party. In other versions of those implementations, the third-party can utilize the third-party dataset to fine-tune the LLM, but still provide the third-party dataset. For example, prior to receiving the NL based input, the third-party dataset that was utilized to fine-tune the LLM can be normalized, segmented, and stored in a third-party index in association with source(s) of respective portions of data included in the third-party dataset. Accordingly, when the NL based summary is generated based on processing the NL based input using the LLM (e.g., when the NL based input is received from a user that is associated with the third-party), the NL based summary can also be normalized and segmented to enable the processor(s) to not only determine whether a NL based summary segment of the NL based summary matches a LLM dataset segment of the LLM dataset that was utilized to initially train the LLM by comparing various NL based summary segments of the NL based summary to the LLM dataset segments that are stored in the index, but to also determine whether a NL based summary segment of the NL based summary matches a third-party dataset segment of the third-party dataset that was utilized to fine-tune the LLM by comparing various NL based summary segments of the NL based summary to the third-party dataset segments that are stored in the third-party index.

In this example, and in response to the processor(s) determining that a NL based summary segment of the NL based summary matches a LLM dataset segment of the LLM dataset that was utilized to initially train the LLM and/or a third-party dataset segment of the third-party dataset segment that was utilized to fine-tune the LLM, the source(s) stored in association therewith that match the NL based summary segment can be quickly and efficiently identified. Further, and based on rule(s) associated with the source(s) stored in association with the LLM dataset segment that match the NL based summary segment and/or third-party rule(s) associated with the source(s) stored in association with the third-party dataset, the NL based summary can be modified to reflect attribution(s) of the source(s) to the NL based summary segment in certain situations. Notably, these third-party rule(s) associated with the source(s) stored in association with the third-party dataset can be specified by the third-party that provided the third-party dataset. Moreover, in various implementations, the third-party index and/or the third-party rule(s) may be access-restricted, and may only be accessed upon receiving a third-party token that is specific to the third-party along with the NL based input associated with the client device of the user that is associated with the third-party.

By using techniques described herein, one or more technical advantages can be achieved. As one non-limiting example, techniques described herein enable NL based summaries that are generated using LLMs to include attribution to source(s) of content that is included in the NL based summary. These attribution(s) can include uniform resource locator(s) (URL(s)) to the source(s), snippets of content located at the URL(s), license(s) for content located at the URL(s), document identifier(s), and/or other forms of attribution described herein. Accordingly, the attribution to the source(s) described herein enables quick and efficient access to the source(s) of the content included in the NL based summary (e.g., via "one-click" or the like). As a result, a duration of a user interaction is reduced and/or a quantity of user inputs is received since the user need not provide additional NL based input requesting the source(s) and/or attempt to identify the source(s) via a separate interaction. As another non-limiting example, techniques described herein enable NL based summaries to be re-generated in different manners when certain conditions are satisfied. For instance, the NL based summaries can be re-generated using different parameters for the LLMs (e.g., different temperature parameters), using modified NL based inputs, using biasing in selecting word(s) or phrase(s) for inclusion in the re-generated NL based summaries. Accordingly, these techniques ensure that the NL based summaries that are re-generated differ from a previously generated NL based summary that was previously generated in response to receiving the NL based input.

The above description is provided as an overview of some implementations of the present disclosure. Further description of those implementations, and other implementations, are described in more detail below.

BRIEF DESCRIPTION OF THE DRAWINGS

FIG. 2 depicts a flowchart illustrating an example method of determining whether to modify a natural language (NL) based summary generated using a large language model (LLM), and causing the NL based summary or a modified NL based summary to be rendered, in accordance with various implementations.

FIG. 3 depicts a flowchart illustrating an example method of pre-processing a dataset that was utilized to initially train a LLM and/or fine-tune the LLM for subsequent utilization in determining whether to modify a NL based summary generated using the LLM, in accordance with various implementations.

FIG. 4 depicts a flowchart illustrating an example method of obtaining metadata associated with source(s) of content captured in a NL based summary for utilization in determining whether to modify a NL based summary generated using the LLM, in accordance with various implementations.

FIG. 5 depicts a flowchart illustrating an example method of modifying a NL based summary generated using a LLM and based on source(s) of content captured in the NL based summary, in accordance with various implementations.

DETAILED DESCRIPTION OF THE DRAWINGS

Figure 1:
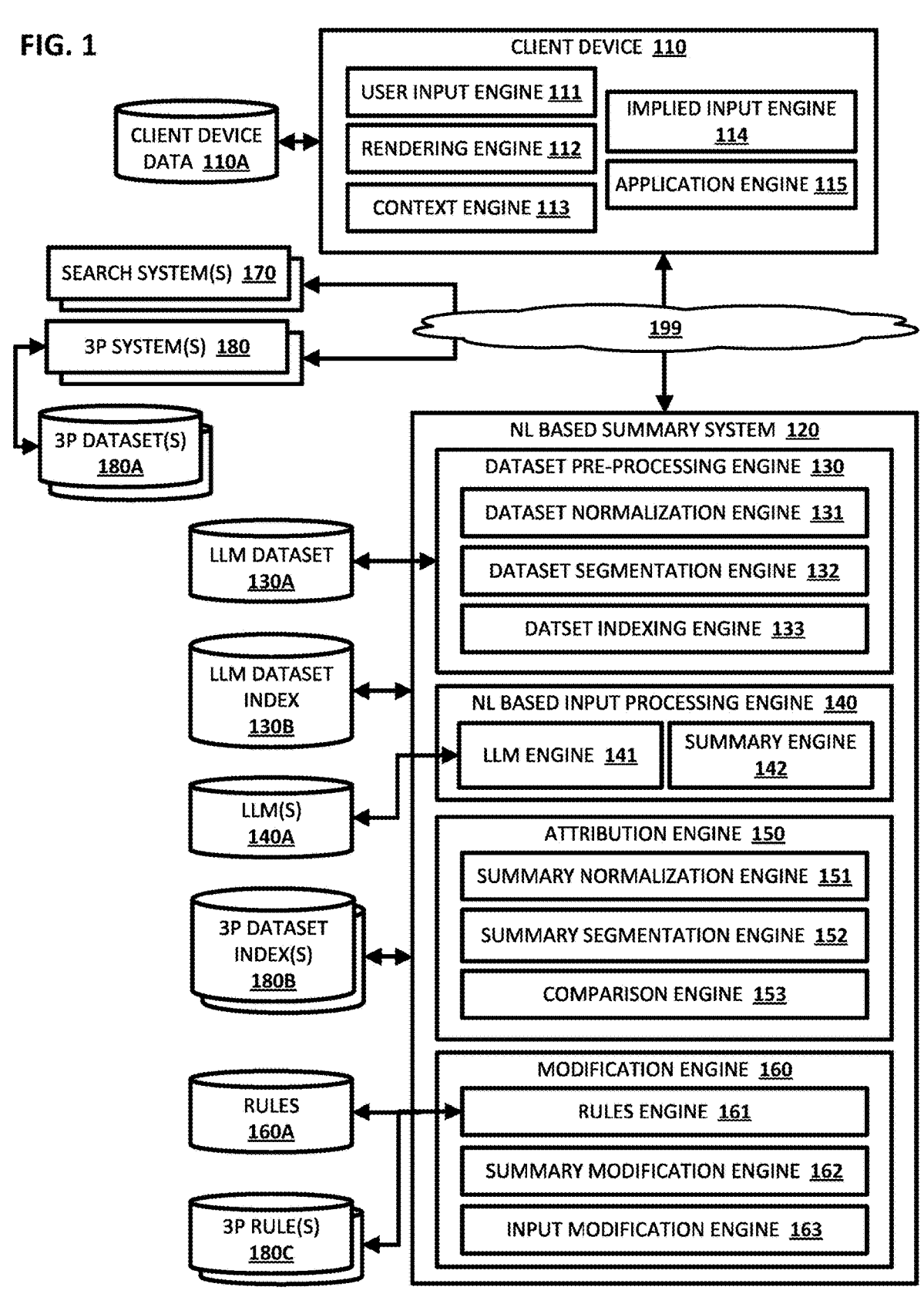
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110, a natural language (NL) based summary system 120, search system(s) 170, and third-party (3P) system(s) 180 that have access to corresponding 3P dataset(s) 180A. Although illustrated separately, in some implementations all or aspects of the NL based summary system 120, and all of aspects of the search system(s) 170 can be implemented as part of a cohesive system.

In some implementations, all or aspects of the NL based summary system 120 can be implemented locally at the client device 110. In additional or alternative implementations, all or aspects of the NL based summary system 120 can be implemented remotely from the client device 110 as depicted in FIG. 1 (e.g., at remote server(s)). In those implementations, the client device 110 and the NL based summary system 120 can be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which NL based input can be submitted and/or NL based summaries and/or other response(s) to the NL based input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser installed on top of the operating system of the client device 110, or the web browser can be a software application that is integrated as part of the operating system of the client device 110. The application engine 115 (and the one or more software applications executed by the application engine 115) can interact with the NL based summary system 120.

In various implementations, the client device 110 can include a user input engine 111 that is configured to detect user input provided by a user of the client device 110 using one or more user interface input devices. For example, the client device 110 can be equipped with one or more micro- phones that capture audio data, such as audio data corre- sponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

Some instances of a NL based input described herein can be a query for a NL response that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110, or an image query that is based on an image captured by a vision component of the client device 110 (or based on NL input generated base on processing the image using, for example, object detection model(s), captioning model(s), etc.). Other instances of a NL based input described herein can be a prompt for NL content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image prompt that is based on an image captured by a vision component of the client device 110.

In various implementations, the client device 110 can include a rendering engine 112 that is configured to provide content (e.g., an NL based summary, an indication of source(s) associated with the NL based summary, and/or other content) for audible and/or visual presentation to a user of the client device 110 using one or more user interface output devices. For example, the client device 110 can be equipped with one or more speakers that enable the content to be provided for audible presentation to the user via the client device 110. Additionally, or alternatively, the client device 110 can be equipped with a display or projector that enables the content to be provided for visual presentation to the user via the client device 110.

In various implementations, the client device 110 can include a context engine 113 that is configured to determine a context (e.g., current or recent context) of the client device 110 and/or of a user of the client device 110 (e.g., an active user of the client device 110 when the client device 110 is associated with multiple users). In some of those implemen- tations, the context engine 113 can determine a context based on data stored in client device data database 110A. The data stored in the client device data database 110A can include, for example, user interaction data that characterizes current or recent interaction(s) of the client device 110 and/or a user of the client device 110, location data that characterizes a current or recent location(s) of the client device 110 and/or a user of the client device 110, user attribute data that characterizes one or more attributes of a user of the client device 110, user preference data that characterizes one or more preferences of a user of the client device 110, user profile data that characterizes a profile of a user of the client device 110, and/or any other data acces- sible to the context engine 113.

For example, the context engine 113 can determine a current context based on a current state of a dialog session (e.g., considering one or more recent queries or prompts provided by a user during the dialog session), profile data, and/or a current location of the client device 110. For instance, the context engine 113 can determine a current context of "visitor looking for popular events in Louisville, Kentucky" based on a recently issued query, profile data, and an anticipated future location of the client device 110 (e.g., based on recently booked hotel accommodations). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting a query or prompt that is formulated based on user input, in generating an implied query or implied prompt (e.g., a query or prompt formulated independent of user input), and/or in determining to submit an implied query or implied prompt and/or to render result(s) (e.g., an NL based summary) for an implied query or implied prompt.

In various implementations, the client device 110 can include an implied input engine 114 that is configured to: generate an implied query or implied prompt independent of any user input directed to formulating the implied query or the implied prompt; to submit an implied query or implied prompt, optionally independent of any user input that requests submission of the implied query or implied prompt; and/or to cause rendering of search result(s) or a NL based summary for an implied query or implied prompt, optionally independent of any user input that requests rendering of the search result(s) or the NL based summary. For example, the implied input engine 114 can use one or more past or current contexts, from the context engine 113, in generating an implied query or implied prompt, determining to submit the implied query or the implied prompt, and/or in determining to cause rendering of search result(s) or a NL based sum- mary that is responsive to the implied query or the implied prompt. For instance, the implied input engine 114 can automatically generate and automatically submit an implied query or implied prompt based on the one or more past or current contexts. Further, the implied input engine 114 can automatically push the search result(s) or the NL based summary that is generated responsive to the implied query or implied prompt to cause them to be automatically ren- dered or can automatically push a notification of the search result(s) or the NL based summary, such as a selectable notification that, when selected, causes rendering of the search result(s) or the NL based summary. Additionally, or alternatively, the implied input engine 114 can submit the implied query or the implied prompt at regular or non- regular intervals, and cause the search result(s) or the NL based summary for the submission(s) to be automatically provided (or a notification thereof automatically provided).

For instance, the implied query or the implied prompt can be "patent news" based on the one or more past or current contexts indicating a user's general interest in patents, the implied query or the implied prompt periodically submitted, and the search result(s) or the NL based summary can be automatically provided (or a notification thereof automatically provided). It is noted that the provided search result(s) or NL based summary result can vary over time in view of, e.g., presence of new/fresh search result document(s) over time.

Further, the client device 110 and/or the NL based summary system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The NL based summary system 120 is illustrated in FIG. 1 as including a dataset pre-processing engine 130, a NL based input processing engine 140, an attribution engine 150, and a modification engine 160. Some of these engines can be combined and/or omitted in various implementations. Further, these engines can include various sub-engines. For instance, the dataset pre-processing engine 130 is illustrated in FIG. 1 as including a dataset normalization engine 131, a dataset segmentation engine 132, and a dataset indexing engine. Further, the NL based input processing engine 140 is illustrated in FIG. 1 as including a LLM engine 141 and a summary engine 142. Moreover, the attribution engine 150 is illustrated in FIG. 1 as including a summary normalization engine 151, a summary segmentation engine 152, and a comparison engine 153. Lastly, the modification engine 160 is illustrated in FIG. 1 as including a rules engine 161, a summary modification engine 162, and an input modification engine 163. Similarly, some of these sub-engines can be combined and/or omitted in various implementations. For instance, the dataset normalization engine 131 of the dataset pre-processing engine 130 and the summary normalization engine 151 of the attribution engine 150 can be combined, the dataset segmentation engine 132 of the dataset pre-processing engine 130 and the summary segmentation engine 152 of the attribution engine 150 can be combined, the LLM engine 141 and the summary engine 142 of the NL based input processing engine 140 can be combined. Accordingly, it should be understood that the various engines and sub-engines of the NL based summary system 120 illustrated in FIG. 1 are depicted for the sake of clarity and are not meant to be limiting.

Further, the NL based summary system 120 is illustrated in FIG. 1 as interfacing with various databases, such as a LLM dataset database 130A, a LLM dataset index database 130B, a LLM(s) database 140A, 3P dataset index(s) database(s) 180B, a rules database 160A, and 3P rule(s) database(s) 180C. Although particular engines and/or sub-engines are depicted as having access to particular databases, it should be understood that is for the sake of example and is not meant to be limiting. For instance, in some implementations, each of the various engines and/or sub-engines of the NL based summary system 120 may have access to each of the various databases. However, in some other implementations, one or more of the various databases may be access-restricted. For instance, the 3P dataset index(s) database(s) 180B and the 3P rule(s) database(s) 180C may be access-restricted such that the NL based summary system 120 can only access these databases in response to receiving a corresponding 3P token from a corresponding 3P that is associated with the corresponding third-party dataset index(s) database(s) 180B and the corresponding 3P rule(s) database(s) 180C.

As described in more detail herein (e.g., with respect to FIGS. 2-7), the NL based summary system 120 can be initially utilized to generate a NL based summary that is responsive to NL based input and based on processing the NL based input using LLM(s). Further, the NL based summary system 120 can be subsequently utilized to process the NL based summary to identify NL based summary segment(s) of the NL based summary that match LLM dataset segment(s) of a LLM dataset that was utilized to initially train the LLM(s) and/or third-party dataset segment(s) of a third-party dataset that was utilized to fine-tune the LLM(s). In implementations where the NL based summary system 120 determines that the NL based summary segment(s) of the NL based summary match the LLM dataset segment(s) of the LLM dataset that was utilized to initially train the LLM(s) and/or the third-party dataset segment(s) of the third-party dataset that was utilized to fine-tune the LLM(s), the NL based summary system 120 can modify the NL based summary based on rule(s) associated with source(s) of the LLM dataset segment(s) of the LLM dataset that was utilized to initially train the LLM(s) and/or the third-party dataset segment(s) of the third-party dataset that was utilized to fine-tune the LLM(s). Accordingly, the NL based summary system 120 can properly attribute the source(s) of the LLM dataset segment(s) of the LLM dataset that was utilized to initially train the LLM(s) and/or the third-party dataset segment(s) of the third-party dataset that was utilized to fine-tune the LLM(s) in the NL based summary that is responsive to the NL based input.

As used herein, the term "third-party" (or "3P") refers to any entity that is separate from an entity that manages, hosts, or otherwise implements the NL based summary system 120. Accordingly, the 3P system(s) 180 refer to any system that is manages, hosted, or otherwise implemented by an entity that is distinct from the entity that manages, hosts, or otherwise implements the NL based summary system 120, and the 3P dataset(s) 180A refer to any data that may be provided by the 3P system(s) 180 and to the NL based summary system 120 for fine-tuning of any LLM(s) stored in the LLM(s) database 140A. As described in more detail herein (e.g., with respect to FIGS. 6 and 7), the NL based summary system 120 can be provided as a service to the 3P system(s) 180 (e.g., in an enterprise environment of the 3P).

Turning now to FIG. 2, a flowchart illustrating an example method 200 of determining whether to modify a natural language (NL) based summary generated using a large language model (LLM), and causing the NL based summary or a modified NL based summary to be rendered is depicted. For convenience, the operations of the method 200 are described with reference to a system that performs the operations. This system of the method 200 includes one or more processors, memory, and/or other component(s) of computing device(s) (e.g., client device 110 of FIG. 1, client device 810 of FIGS. 8A-8C, and/or computing device 910 of FIG. 9, one or more servers, and/or other computing devices). Moreover, while operations of the method 200 are shown in a particular order, this is not meant to be limiting. One or more operations may be reordered, omitted, and/or added.

At block 252, the system receives NL based input associated with a client device. In some implementations, the NL based input can be one formulated based on explicit user interface input at a client device (e.g., detected via the user input engine 111), such as typed input, voice input, input to cause an image to be captured or selected, etc. In some of those implementations, the NL based input can be a query. The query can be, for example, a voice query, a typed query, an image-based query, or a multimodal query (e.g., that includes voice input and an image). In some implementations, when the query includes content that is not in textual format, the system can convert the query to a textual format or other format. For example, if the query is a voice query the system can perform automatic speech recognition (ASR) to convert the query to textual format. As another example, assume the query is a multimodal query that includes an image of an avocado and a voice input of "is this healthy". In such an example, the system can perform ASR to convert the voice input to text form, can perform image processing on the image to recognize an avocado is present in the image, and can perform co-reference resolution to replace "this" with "an avocado", resulting in a textual format query of "is an avocado healthy".

In some versions of those implementations, the NL based input can be received in an application environment of one or more software applications that are accessible at the client device, such as a browser software application, an automated assistant software application, etc. (e.g., via the application engine 115). In additional or alternative versions of those implementations, the system can augment the NL based input (e.g., augment the explicit input) with additional information, such as one or more past or current contexts of the client device and/or a user of the client device.

In other implementations, the query can alternatively be an implied query or an inferred/parameterless query, such as one formulated and/or submitted independent of any explicit user input directed to formulating the implied query (e.g., as described with respect to the context engine 113 and/or the implied input engine 114 of FIG. 1). For example, the query can be an implied query that is automatically generated based on profile data and that is automatically submitted. For instance, the implied query can be "machine learning", based on profile data indicating interest in machine learning topic(s). As another example, the query can be an implied query that is automatically generated and/or automatically submitted based on a current and/or recent context. As yet another example, the query can be an implied query that is submitted based on the user providing some indication of a desire to perform a search (e.g., pushing a search button, performing a search touch gesture, accessing a particular screen or state of an application), but that is generated automatically based on content currently being displayed at a client device, location, time of day, and/or other context signal(s).

At block 254, the system generates, based on processing the NL based input using a LLM that was initially trained on an LLM dataset, a NL based summary that is responsive to the NL based input. The LLM can include, for example, any LLM that is stored in the LLM(s) database 140A, such as BERT, LaMDA, Meena, GPT-3, GPT-4, and/or any other LLM. Further, the LLM dataset can include any dataset stored in the LLM dataset database 130A that was utilized to train the LLM. In various implementations, in generating the NL based summary that is responsive to the NL based input, the system can cause the LLM engine 141 to process, using the LLM, the NL based input, to generate LLM output. The LLM output can include, for example, a probability distribution over a sequence of words or phrases that are predicted to be responsive to the NL based input. Further, the system can cause the summary engine 142 to generate, based on the LLM output, the NL based summary that is responsive to the NL based input. For example, the system can cause the summary engine 142 to select particular words or phrases to include in the NL based summary based on the probability distribution over the sequence of words or phrases. In some implementations, the system can bias away from words or phrases from the LLM dataset in causing the summary engine 142 to select the particular words or phrases to include in the NL based summary.

At block 256, the system processes the NL based summary to determine whether a NL based summary segment of the NL based summary matches a LLM dataset segment of the LLM dataset that was utilized to initially train the LLM. In various implementations, the system can pre-process the LLM dataset (e.g., using the dataset pre-processing engine 130 and as described with respect to FIG. 3) prior to receiving the NL based input to determine a plurality of LLM dataset segments for the LLM dataset that was utilized to initially train the LLM. The plurality of LLM dataset segments can be stored in one or more databases that are available to the system (e.g., in the LLM dataset index database 130B). Further, and in response to the system generating the NL based summary, the system can process the NL based summary to determine a plurality of NL based summary segments for the NL based summary (e.g., using the attribution engine 140 and as described with respect to FIG. 4). In some implementations, the system can process the NL based summary to determine the plurality of NL based summary segments for the NL based summary as the NL based summary is generated and in a streaming manner. In some other implementations, the system can wait for the entirety of the NL based summary to be generated prior to determining the plurality of NL based summary segments for the NL based summary.

At block 258, the system determines, based on the processing at block 256, whether a NL based summary segment of the NL based summary matches a LLM dataset segment of the LLM dataset that was utilized to initially train the LLM. For example, the system can determine the NL based summary segment matches the LLM dataset segment based on comparing alphanumeric characters of the NL based summary segment to alphanumeric characters of the LLM dataset segment on a word-by-word basis and/or character-by-character basis. For instance, in this example, the system can determine that the NL based summary segment matches the LLM dataset segment based on each of the alphanumeric characters of the respective segments being an exact match or a threshold quantity of the alphanumeric characters of the respective segments being an exact match. By considering the threshold quantity of the alphanumeric characters of the respective segments being an exact match (e.g., in addition to, or in lieu of, only considering an exact match for each of the alphanumeric characters of the respective segments), the system can be more robust to the only differences between the NL based summary segment and the LLM dataset segment being only semantically irrelevant differences.

If, at an iteration of block 258, the system determines that a NL based summary segment of the NL based summary matches a LLM dataset segment of the LLM dataset that was utilized to initially train the LLM, then the system proceeds to block 260. At block 260, the system modifies the NL based summary to generate a modified NL based summary. At block 262, the system causes the modified NL based summary to be rendered at the client device (e.g., via the rendering engine 112). In various implementations, the system can modify the NL based summary in different manners based on source(s) that are associated with content captured in the NL based summary segment of the NL based summary that matches the LLM dataset segment of the LLM dataset that was utilized to initially train the LLM (e.g., using the modification engine 160 and as described with respect to FIG. 5). Put another way, the system can modify the NL based summary to include proper attributions when appropriate (e.g., using rule(s) stored in the rules database 160A).

If, at an iteration of block 258, the system determines that a NL based summary segment of the NL based summary does not match a LLM dataset segment of the LLM dataset that was utilized to initially train the LLM, then the system proceeds to block 264. At block 264, the system causes the NL based summary to be rendered at the client device (e.g., via the rendering engine 112). Put another way, the system need not modify the NL based summary to include proper attributions when not appropriate.

Figure 6:
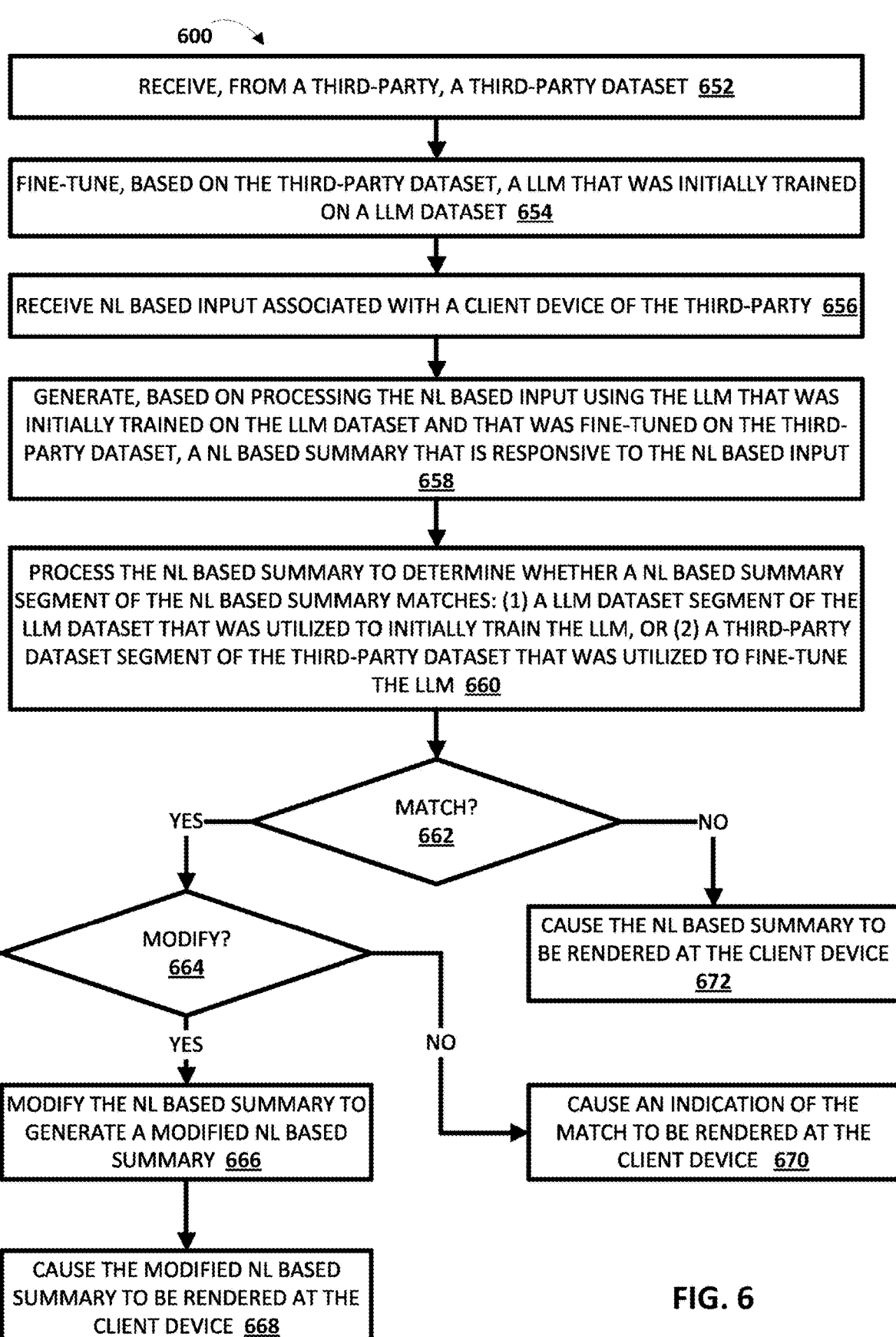
FIG. 6 depicts a flowchart illustrating an example method of fine-tuning a LLM on behalf of a third-party, and determining whether to modify a NL based summary generated using the LLM on behalf of the third-party, in accordance with various implementations.
Figure 7:
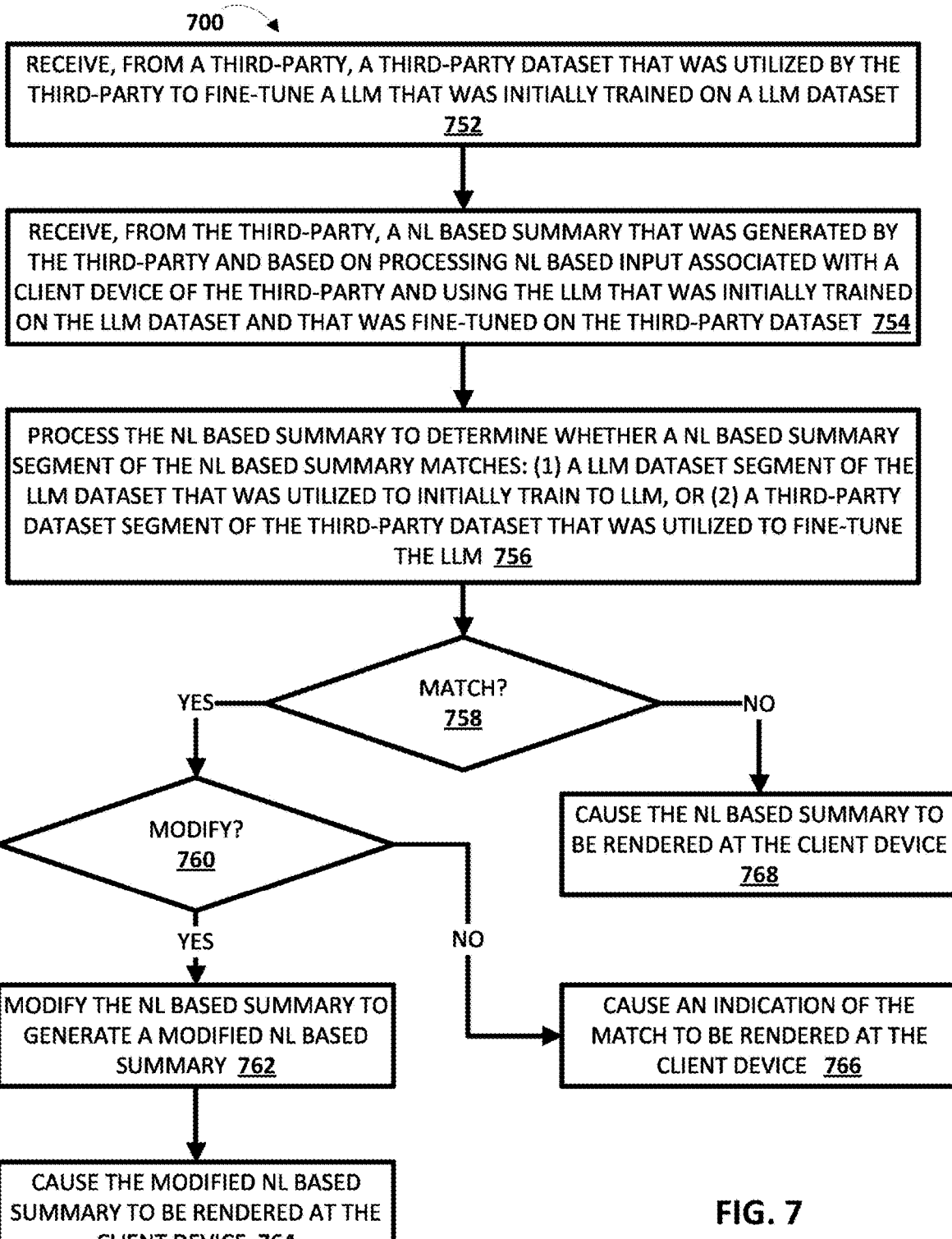
FIG. 7 depicts a flowchart illustrating an example method of determining whether to modify a NL based summary generated by a third-party using a LLM fine-tuned by the third-party and on behalf of the third-party, in accordance with various implementations.

Although the method 200 of FIG. 2 is not described with respect to any of the 3P system(s) 180, it should be understood that one or more aspects of the NL based summary system 120 can be provided as a service to the 3P system(s) 180 (e.g., as described with respect to FIGS. 6 and 7).

Turning now to FIG. 3, a flowchart illustrating an example method 300 of pre-processing a dataset that was utilized to initially train a LLM and/or fine-tune the LLM for subsequent utilization in determining whether to modify a NL based summary generated using the LLM is depicted. For convenience, the operations of the method 300 are described with reference to a system that performs the operations. This system of the method 300 includes one or more processors, memory, and/or other component(s) of computing device(s) (e.g., client device 110 of FIG. 1, client device 810 of FIGS. 8A-8C, and/or computing device 910 of FIG. 9, one or more servers, and/or other computing devices). Moreover, while operations of the method 300 are shown in a particular order, this is not meant to be limiting. One or more operations may be reordered, omitted, and/or added.

At block 352, the system normalizes a dataset that was utilized to initially train a LLM and/or fine-tune the LLM (e.g., using the dataset normalization engine 131 of the dataset pre-processing engine 130 of FIG. 1). For example, in some implementations, block 352 includes sub-block 352A in which the system converts all capitalized alphanumeric characters in the dataset into lowercase alphanumeric characters. As another example, in some additional or alternative implementations, block 352 includes sub-block 352B in which the system converts all punctuation in the dataset into single spaces. As yet another example, in some additional or alternative implementations, block 352 includes sub-block 352C in which the system converts all white spaces in the dataset into single spaces. Put another way, the system can implement various normalization operations on the dataset in an "offline" manner prior to receiving any NL based input to enable the system to subsequently compare dataset segments of the dataset to NL based summary segments of an NL based summary. Although particular normalization operations are described herein, it should be understood that the particular normalization operations described herein are provided for the sake of example and are not meant to be limiting.

In some implementations, the dataset can include, for example, an LLM dataset (e.g., stored in the LLM dataset database 130A) that was utilized to initially train the LLM. In additional or alternative implementations, the dataset can include, for example, a third-party dataset (e.g., stored in the 3P dataset(s) database 180A) that the 3P system(s) 180 provide to the system to fine-tune the LLM on behalf of the 3P or that the 3P system(s) 180 utilized to fine-tune the LLM. The LLM dataset and/or the third-party dataset can include any natural language content that may be utilized to initially train and/or fine-tune the LLM, such as data from webpages (e.g., public domain webpages, licensed webpages, non-public domain webpages, and/or other webpages), electronic books (e.g., public domain electronic books and/or non-public domain electronic books), electronic documents (e.g., electronic word processing documents, electronic PDFs, etc.), electronic communications (e.g., electronic mail, SMS messages, social media posts or messages), software code (e.g., public domain software code, licensed software code, and/or non-public domain software code), electronic news articles, mathematical formulas, machine translation data, and/or any other data from any other source that can be utilized to train and/or fine-tune the LLM.

At block 354, the system processes alphanumeric characters of the normalized dataset to identify a word boundary in the normalized dataset (e.g., using the dataset segmentation engine 132 of the dataset pre-processing engine 130 of FIG. 1). The word boundary can include any string of alphanumeric characters in the dataset that defines a word. If, at an iteration of block 354, the system determines that no word boundary in the normalized dataset has been identified, then the system continues monitoring for the word boundary at block 354. If, at an iteration of block 354, the system determines that a word boundary has been identified, then the system proceeds to block 356. Put another way, the system can continually process the dataset until a word boundary is identified. For example, assume that the dataset includes the alphanumeric characters of "prima facie case of patent ineligible subject matter". In this example, "prima" may correspond to a first word boundary, "facie" may correspond to a second word boundary, "case" may correspond to a third word boundary, and so on.

At block 356, the system identifies a fixed number of alphanumeric characters starting at the word boundary or a fixed number of words starting at the word boundary (e.g., using the dataset segmentation engine 132 of the dataset pre-processing engine 130 of FIG. 1). The fixed number of alphanumeric characters starting at the word boundary and/ or the fixed number of words starting at the word boundary can be a tunable parameter in that can be dynamically adjusted by a developer associated with the system. At block 358, the system stores a given dataset alphanumeric segment in an index, the given dataset alphanumeric segment including the fixed number of alphanumeric characters starting at the word boundary or the fixed number of words starting at the word boundary (e.g., using the dataset indexing engine 133 of the dataset pre-processing engine 130 of FIG. 1). In some implementations, block 358 includes sub-block 358A in which the system stores metadata that identifies one or more sources of content captured in the given dataset alphanumeric segment in association with the given dataset alphanumeric segment in the index. The system returns to block 354 to process the alphanumeric characters of the normalized dataset to identify an additional word boundary in the normalized dataset.

Continuing with the above example where the dataset includes the alphanumeric characters of "prima facie case of patent ineligible subject matter", further assume that the system utilizes the fixed number of words starting at the word boundary, and further assume that the fixed number of words starting at the words boundary corresponds to six as defined by the developer associated with the system. In this example, a first dataset alphanumeric segment may correspond to "prima facie case of patent ineligible" that starts at the first word boundary of "prima", a second dataset alphanumeric segment may correspond to "facie case of patent ineligible subject" that starts at the second word boundary of "facie", a third dataset alphanumeric segment may correspond to "case of patent ineligible subject matter" that starts at the third word boundary of "case", and so on. Further, the system can store each of the dataset alphanumeric segments in an index. For instance, in implementations where the dataset alphanumeric segments are generated based on processing the LLM dataset that was utilized to initially train the LLM, the dataset alphanumeric segments can be stored in the LLM dataset index database 130B. Also, for instance, in implementations where the dataset alphanumeric segments are generated based on processing the third-party dataset that was utilized to fine-tune the LLM, the dataset alphanumeric segments can be stored in the 3P dataset index(s) database 180B. Notably, in implementations where multiple distinct 3P system(s) 180 managed by distinct 3Ps provide respective 3P dataset(s) 180A for fine-tuning respective instances of the LLM, each of the multiple distinct 3P system(s) 180 may have a dedicated 3P dataset index(s) database 180B that is access-restricted.

Further, and continuing with the above example where the dataset includes the alphanumeric characters of "prima facie case of patent ineligible subject matter", further assume that the alphanumeric characters of "prima facie case of patent ineligible subject matter" are associated with one or more sources. For instance, the alphanumeric characters of "prima facie case of patent ineligible subject matter" may be associated with an electronic document corresponding to the Manual of Patent Examining Procedure (MPEP) that was utilized to initially train the LLM. Accordingly, in this instance, the alphanumeric characters can be stored in association with metadata that indicates the alphanumeric characters of "prima facie case of patent ineligible subject matter" is derived from the MPEP and optionally include a uniform resource locator (URL) to an electronic version of the MPEP. Also, for instance, the alphanumeric characters of "prima facie case of patent ineligible subject matter" may be associated with an electronic document corresponding to a response to an Office Action provided by a given 3P system of the 3P system(s) 180 that was utilized to fine-tune the LLM. Accordingly, in this instance, the alphanumeric characters can be stored in association with metadata that indicates the alphanumeric characters of "prima facie case of patent ineligible subject matter" is additionally, or alternatively, derived from the response to an Office Action provided by a given 3P system and optionally include a URL to the response to the Office Action or a document identifier for the response to the Office Action.

In various implementations, one or more iterations of the operations of the method 300 of FIG. 3 can be performed in parallel. For instance, the system can continue normalizing the dataset while the system also identifies the word boundaries, identifies the dataset alphanumeric segments, and stores the dataset alphanumeric segments in the index. Further, although the above alphanumeric segments from the above example are described as including six words, it should be understood that is for the sake of example and is not meant to be limiting. Rather, it should be understood that the developer associated with the system (or a developer associated with the third-party) can define different lengths of the alphanumeric segments. Moreover, although the above alphanumeric segments from the above example are described as including six words, it should be understood that is for the sake of example and is not meant to be limiting. Rather, it should be understood that the developer associated with the system (or a developer associated with the third-party) can define the alphanumeric segments in terms of alphanumeric characters in lieu of words.

Although the method 300 of FIG. 3 is described with respect to generating the respective index(s) of the respective dataset segments, it should be understood that is for the sake of example to illustrate various techniques contemplated herein, and is not meant to be limiting. For example, in additional or alternative implementations, the system can generate Bloom Filter(s) for the respective dataset segments. Notably, a quantity of the dataset segments stored in the LLM dataset index database 130B and/or the 3P dataset index(s) database 180B can be in the order of hundreds of billions or trillions of dataset segments. These Bloom Filter(s) can offer better compression in terms of storage space, and, as a result, can enable the storage of more dataset segments. However, these Bloom Filter(s) may not provide the option for storing the corresponding metadata in association with the dataset segments that includes the source(s) of the content captured in the dataset segments. Thus, these Bloom Filter(s) may add a layer of complexity that is obviated through utilization of the respective index(s).

Turning now to FIG. 4, a flowchart illustrating an example method 400 of obtaining metadata associated with source(s) of content captured in a NL based summary for utilization in determining whether to modify a NL based summary generated using the LLM is depicted. For convenience, the operations of the method 400 are described with reference to a system that performs the operations. This system of the method 400 includes one or more processors, memory, and/or other component(s) of computing device(s) (e.g., client device 110 of FIG. 1, client device 810 of FIGS. 8A-8C, and/or computing device 910 of FIG. 9, one or more servers, and/or other computing devices). Moreover, while operations of the method 400 are shown in a particular order, this is not meant to be limiting. One or more operations may be reordered, omitted, and/or added.

At block 452, the system normalizes a NL based summary that was generated using a LLM and/or a fine-tuned LLM (e.g., using the summary normalization engine 151 of the attribution engine 150 of FIG. 1). For example, in some implementations, block 452 includes sub-block 452A in which the system converts all capitalized alphanumeric characters in the NL based summary into lowercase alphanumeric characters. As another example, in some additional or alternative implementations, block 452 includes sub-block 452B in which the system converts all punctuation in the NL based summary into single spaces. As yet another example, in some additional or alternative implementations, block 452 includes sub-block 452C in which the system converts all white spaces in the NL based summary into single spaces. Put another way, as part of the operations of block 256 of the method 200 of FIG. 2, the system can implement various normalization operations on the NL based summary that are the same or similar to those described with respect to the dataset at block 352 of the method 300 of FIG. 3. This normalization enables efficient comparisons between NL based summary segments of the NL based summary and respective dataset segments of respective datasets utilized to initially train the LLM and/or fine-tune the LLM. Similar to block 352 of the method 300 of FIG. 3, although particular normalization operations are described herein, it should be understood that the particular normalization operations described herein are provided for the sake of example and are not meant to be limiting.

At block 454, the system processes alphanumeric characters of the normalized NL based summary to identify a word boundary in the NL based summary (e.g., using the summary segmentation engine 152 of the attribution engine 150 of FIG. 1). As noted above with respect to the operations of block 354 of the method 300 of FIG. 3, the word boundary can include any string of alphanumeric characters in the dataset that defines a word. If, at an iteration of block 454, the system determines that no word boundary in the normalized NL based summary has been identified, then the system continues monitoring for the word boundary at block 454. If, at an iteration of block 454, the system determines that a word boundary has been identified, then the system proceeds to block 456. Put another way, the system can continually process the NL based summary until a word boundary is identified.

At block 456, the system identifies a fixed number of alphanumeric characters starting at the word boundary or a fixed number of words starting at the word boundary (e.g., using the summary segmentation engine 152 of the attribution engine 150 of FIG. 1). As noted above with respect to the operations of block 356 of the method 300 of FIG. 3, the fixed number of alphanumeric characters starting at the word boundary and/or the fixed number of words starting at the word boundary can be a tunable parameter in that can be dynamically adjusted by a developer associated with the system. At block 458, the system compares the fixed number of alphanumeric characters starting at the word boundary or the fixed number of words starting at the word boundary to a plurality of dataset alphanumeric segments for a dataset that was utilized to initially train the LLM and/or to fine-tune the LLM (e.g., using the comparison engine 153 of the attribution engine 150 of FIG. 1). Put another way, as part of the operations of block 256 of the method 200 of FIG. 2, the system can compare each of the NL based summary segments of the NL based summary (e.g., that are identified according to the method 400 of FIG. 4) to each of the dataset segments (e.g., that were previously stored in the LLM dataset index database 130B and/or the 3P dataset index(s) database 180B according to the method 300 of FIG. 3) to determine whether any of the NL based summary segments of the NL based summary match any of the dataset segments. Notably, each of the NL based summary segments of the NL based summary and each of the dataset segments are normalized in the same or similar manner to enable these comparisons to be performed in a quick and efficient manner, thereby reducing latency in causing the NL based summary or the modified NL based summary to be rendered at the client device.

The system returns to block 454 to process the alphanumeric characters of the NL based summary to identify an additional word boundary in the normalized NL based summary. As noted above with respect to the method 200 of FIG. 2, in some implementations, the system can process the NL based summary to determine the plurality of NL based summary segments for the NL based summary (e.g., the word boundaries of the NL based summary and the corresponding fixed number of alphanumeric characters starting at the word boundary or the corresponding fixed number of words starting at the word boundary) as the NL based summary is generated and in a streaming manner. This enables the system to effectively compare each of the NL based summary segments of the NL based summary to each of the dataset segments as each of the plurality of NL based summary segments are determined by the system. However, in some other implementations, the system can wait for the entirety of the NL based summary to be generated prior to determining the plurality of NL based summary segments for the NL based summary.

As noted above, a quantity of the dataset segments (e.g., that were previously stored in the LLM dataset index database 130B and/or the 3P dataset index(s) database 180B according to the method 300 of FIG. 3) can be in the order of hundreds of billions or trillions of dataset segments. Accordingly, in various implementations, and in comparing the NL based summary segments to the dataset segments, the system can utilize various techniques to more efficiently perform the comparisons. For example, in some implementations, the system can utilize a low-latency key value storage technique to more efficiently perform the comparisons. As another example, in additional or alternative implementations, the system can utilize an index sharding technique to more efficiently perform the comparisons. By utilizing one or more of these techniques, the system may not be required to compare each of the NL based summary segments to each of the dataset segments, thereby reducing latency in causing the NL based summary or the modified NL based summary to be rendered at the client device.

At block 460, the system determines whether the fixed number of alphanumeric characters starting at the word boundary or the fixed number of words starting at the word boundary match a given dataset alphanumeric segment for the dataset that was utilized to initially train the LLM and/or to fine-tune the LLM from among the plurality of dataset alphanumeric segments. As noted above with respect to block 258 of the method 200 of FIG. 2, the system can determine the NL based summary segment matches the LLM dataset segment based on comparing alphanumeric characters of the NL based summary segment to alphanumeric characters of the dataset segment on a word-by-word basis and/or character-by-character basis. For instance, the system can determine that the NL based summary segment matches the LLM dataset segment based on comparing alphanumeric characters of the NL based summary segment to alphanumeric characters of the dataset segment based on each of the alphanumeric characters of the respective segments being an exact match or a threshold quantity of the alphanumeric characters of the respective segments being an exact match (e.g., as described with respect to block 258 of the method 200 of FIG. 2).

If, at an iteration of block 460, the system determines that the fixed number of alphanumeric characters starting at the word boundary or the fixed number of words starting at the word boundary does not match a given dataset alphanumeric segment for the dataset that was utilized to initially train the LLM and/or to fine-tune the LLM from among the plurality of dataset alphanumeric segments, then the system returns to block 458 to continue comparing additional fixed number of alphanumeric characters starting at the word boundary or the fixed number of words starting at the word boundary match to the plurality of dataset alphanumeric segments for the dataset that was utilized to initially train the LLM and/or to fine-tune the LLM. If, at an iteration of block 460, the system determines that the fixed number of alphanumeric characters starting at the word boundary or the fixed number of words starting at the word boundary does match a given dataset alphanumeric segment for the dataset that was utilized to initially train the LLM and/or to fine-tune the LLM from among the plurality of dataset alphanumeric segments, then the system proceeds to block 462.

At block 462, the system obtains, from an index, metadata that identifies one or more sources of content captured in the given dataset alphanumeric segment and that is stored in association with the given dataset alphanumeric segment that matches the fixed number of alphanumeric characters starting at the word boundary or the fixed number of words starting at the word boundary. Put another way, in response to the system determining that a given NL based summary segment of the NL based summary matches a given dataset alphanumeric segment for the dataset that was utilized to initially train the LLM and/or to fine-tune the LLM, the system can obtain metadata that identifies one or more sources of content captured in the given dataset alphanumeric segment. As described with respect to FIG. 5, this enables the system to subsequently modify the given NL based summary segment to attribute the given NL based summary segment to the one or more sources of the content captured therein. Notably, in various implementations, the given dataset alphanumeric segment that is determined to match the given NL based summary segment can be associated with multiple sources (e.g., as described with respect to FIGS. 8A-8C). Also, multiple given NL based summary segments of the NL based summary can be associated with corresponding dataset segments (e.g., also as described with respect to FIGS. 8A-8C).

Turning now to FIG. 5, a flowchart illustrating an example method 500 of modifying a NL based summary generated using a LLM and based on source(s) of content captured in the NL based summary is depicted. For convenience, the operations of the method 500 are described with reference to a system that performs the operations. This system of the method 500 includes one or more processors, memory, and/or other component(s) of computing device(s) (e.g., client device 110 of FIG. 1, client device 810 of FIGS. 8A-8C, and/or computing device 910 of FIG. 9, one or more servers, and/or other computing devices). Moreover, while operations of the method 500 are shown in a particular order, this is not meant to be limiting. One or more operations may be reordered, omitted, and/or added.

At block 552, the system determines, based on metadata stored in an index and in association with a given dataset segment for a dataset that was utilized to initially train a LLM and/or to fine-tune the LLM that matches a given NL based summary segment of an NL based summary, one or more sources of content captured in the given dataset segment. As noted above with respect to block 352 of the method 300 of FIG. 3, the one or more sources can correspond to, for example, webpages (e.g., public domain webpages, licensed webpages, non-public domain webpages, and/or other webpages), electronic books (e.g., public domain electronic books and/or non-public domain electronic books), electronic documents (e.g., electronic word processing documents, electronic PDFs, etc.), electronic communications (e.g., electronic mail, SMS messages, social media posts or messages), software code (e.g., public domain software code, licensed software code, and/or non-public domain software code), electronic news articles, mathematical formulas, machine translation data, and/or any other sources of data that can be utilized to train and/or fine-tune the LLM. Further, and as noted above with respect to block 358 of the method 300 of FIG. 3, the metadata can be stored in association with the respective dataset segments for the datasets utilized to initially train the LLM and/or to fine-tune the LLM. Moreover, and as described above with respect to the method 400 of FIG. 4, the system can obtain the metadata associated with the one or more sources of the content captured in the NL based summary for utilization in determining whether to modify the NL based summary generated using the LLM.

At block 554, the system identifies, based on the one or more sources of the content captured in the given dataset segment, one or more rules for how to modify the given NL based summary segment (e.g., using the rules engine 161 of the modification engine 160 of FIG. 1). At block 556, the system determines which of the one or more rules to utilize in modifying the given NL based summary segment (e.g., using the rules engine 161 of the modification engine 160 of FIG. 1). Notably, the system can apply different rules (e.g., stored in the rules database 160A) for how to modify the given NL based summary segment based on the one or more sources of the content captured in the given dataset segment and/or based on a type of the one or more sources of the content captured in the given dataset segment. Further, in implementations where the NL based summary system 120 is provided as a service to one or more of the 3P system(s) 180A, each of the one or more of the 3P system(s) 180A can optionally provide 3P rules (e.g., stored in the respective 3P rule(s) database(s) 180C) to be utilized in addition to, or in lieu of, the rules. Accordingly, the remaining operations of the method 500 of FIG. 5 is described with respect to some non-limiting examples of rules that can be utilized to modify the NL based summary.

For example, in some implementations, the system may determine to modify the given NL based summary segment to include uniform resource locator(s) (URL(s)) for one or more of the sources of the content captured in the given dataset segment. In these implementations, the system may proceed from block 556 to block 558. For instance, in response to determining that the one or more sources include a corresponding public domain webpage, a corresponding public domain electronic book, a corresponding electronic news article, or corresponding machine translation data, the system may proceed from block 556 to block 558. At block 558, the system modifies the NL based summary segment of the NL based summary to include the URL(s) to the source(s) (e.g., using the summary modification engine 162 of the modification engine 160 of FIG. 1). In some implementations, the URL(s) to the source(s) can be included in-line with the NL based summary segment in the NL based summary. In additional or alternative implementations, the URL(s) to the source(s) can be included along with, but separate from, the NL based summary. In implementations where the modified NL based summary is visually rendered at the client device, the URL(s) enable a user of the client device to quickly and efficiently access the source(s) via "one-click" of the URL(s) to the source(s). Additionally, or alternatively, the system can provide a snippet of content at the URL(s) to the source(s) and/or URL(s) and/or snippets to related source(s). In implementations where the modified NL based summary is audibly rendered at the client device, an indication of the source(s) can be audibly rendered. Additionally, or alternatively, the system can provide an audible tone (e.g., an earcon) that the source(s) are available, but without actually providing the indication of the source(s).

As another example, in additional or alternative implementations, the system may determine to modify the given NL based summary segment to include uniform resource locator(s) (URL(s)) and license(s) for one or more of the sources of the content captured in the given dataset segment. In these implementations, the system may proceed from block 556 to block 560. For instance, in response to determining that the one or more sources include a corresponding licensed webpage, or corresponding licensed software code, the system may proceed from block 556 to block 560. At block 560, the system modifies the NL based summary segment of the NL based summary to include the URL(s) to the source(s) and additional URL(s) to license(s) for the source(s) (e.g., using the summary modification engine 162 of the modification engine 160 of FIG. 1). The URL(s) to the source(s) and the additional URL(s) to license(s) for the source(s) can be subsequently visually and/or audibly rendered in the same or similar manner described above with respect to block 558 of the method 500 of FIG. 5.

As yet another example, in additional or alternative implementations, the system may determine to modify the given NL based summary segment by generating an additional NL based summary entirely, or by truncating or removing portions of the given NL based summary segment of the NL based summary. In these implementations, the system may proceed from block 556 to block 562. For instance, in response to determining that the one or more sources include a corresponding non-public domain webpage, a corresponding non-public domain electronic book, or corresponding non-public domain software code, the system may proceed from block 556 to block 562.

At block 562, the system determines whether to generate an additional NL based summary. The system can determine whether to generate the additional NL based summary entirely, or by truncate or remove portions of the given NL based summary segment of the NL based summary based on a given rule for how to modify the NL based summary in response to determining that the one or more sources include a corresponding non-public domain webpage, a corresponding non-public domain electronic book, or corresponding non-public domain software code, or any other sources to which the given rule applies. If, at an iteration of block 562, the system determines to generate an additional NL based summary, the system proceeds to block 564. At block 564, the system generates the additional NL based summary (e.g., using the input modification engine 163 of the modification engine 160 of FIG. 1).

For example, in some implementations, block 564 includes sub-block 564A in which the system generates the additional NL based summary by re-processing the NL based on input using the LLM and subsequently biasing away from the given dataset segment that matches the given NL based summary segment. Similar to the operations described above with respect to block 254 of the method 200 of FIG. 2, in generating the additional NL based summary that is responsive to the NL based input, the system can cause the LLM engine 141 to process, using the LLM, the NL based input, to generate LLM output. The LLM output can include, for example, a probability distribution over a sequence of words or phrases that are predicted to be responsive to the NL based input. Further, the system can cause the summary engine 142 to generate, based on the LLM output, the additional NL based summary that is responsive to the NL based input. For example, the system can cause the summary engine 142 to select particular words or phrases to include in the additional NL based summary based on the probability distribution over the sequence of words or phrases. However, in causing the summary engine 142 to select particular words or phrases to include in the additional NL based summary, the system can cause the summary engine 142 to bias away from word and/or phrases included in the given NL based summary segment. Accordingly, the system can ensure that the additional NL based summary does not include the NL based summary segment that matched the dataset segment.

As another example, in some implementations, and similar to the operations of sub-block 564A, the system can generate the additional NL based summary by re-processing the NL based on input using the LLM and can adjust a temperature parameter of the LLM in generating the additional NL based summary. Similar to the operations described above with respect to block 254 of the method 200 of FIG. 2, in generating the additional NL based summary that is responsive to the NL based input, the system can cause the LLM engine 141 to process, using the LLM, the NL based input, to generate LLM output. The LLM output can include, for example, a probability distribution over a sequence of words or phrases that are predicted to be responsive to the NL based input. Further, the system can cause the summary engine 142 to generate, based on the LLM output, the additional NL based summary that is responsive to the NL based input. For example, the system can cause the summary engine 142 to select particular words or phrases to include in the additional NL based summary based on the probability distribution over the sequence of words or phrases. However, by adjusting the temperature parameter of the LLM, the additional NL based summary is more likely to include different words or phrases that are unlikely to match the given NL based summary segment that was determined to match the given dataset segment. Accordingly, in this example, the system need not subsequently bias away from the given dataset segment due to the adjustment of the temperature parameter.

As yet another example, in additional or alternative implementations, block 564 includes sub-block 564B in which the system generates the additional NL based summary by modifying the NL based input to which the NL based summary is responsive to and by processing the modified NL based input using the LLM. For example, the system can utilize an additional generative machine learning model that is trained to re-phrase the NL based input and/or to generate other NL based content to supplement the NL based input. Similar to the operations described above with respect to block 254 of the method 200 of FIG. 2, in generating the additional NL based summary that is responsive to the NL based input, the system can cause the LLM engine 141 to process, using the LLM, the modified NL based input, to generate LLM output. The LLM output can include, for example, a probability distribution over a sequence of words or phrases that are predicted to be responsive to the modified NL based input. Further, the system can cause the summary engine 142 to generate, based on the LLM output, the additional NL based summary that is responsive to the modified NL based input. For example, the system can cause the summary engine 142 to select particular words or phrases to include in the additional NL based summary based on the probability distribution over the sequence of words or phrases.

If, at an iteration of block 562, the system determines not to generate an additional NL based summary, the system proceeds to block 566. At block 566, the system truncates or removes a portion of the given NL based summary segment of the NL based summary (e.g., using the summary modification engine 162 of the modification engine 160 of FIG. 1). For example, in some implementations, the system truncate a portion of the given NL based summary segment, such as truncating a threshold quantity of words or phrases from the given NL based summary segment of the NL based summary to reduce a length of the given NL based summary segment of the NL based summary below the fixed number of alphanumeric characters starting at the word boundary or the fixed number of words starting at the word boundary. However, in some implementations, the truncated NL based summary segment may not be semantically coherent or convey the correct information. Accordingly, in these implementations, the system can remove the given NL based summary segment from the NL based summary to ensure that the NL based summary is semantically correct.

Although the method 500 of FIG. 5 is described with respect to a single source being associated with the given NL based summary segment of the NL based summary, it should be understood that is for the sake of simplicity and is not meant to be limiting. As described in more detail herein (e.g., with respect to FIGS. 8A-8C), the system can implement various combinations of the rules described to determine how to modify the given NL based summary segment of the NL based summary.

Turning now to FIG. 6, a flowchart illustrating an example method 600 of fine-tuning a LLM on behalf of a third-party, and determining whether to modify a NL based summary generated using the LLM on behalf of the third-party is depicted. For convenience, the operations of the method 600 are described with reference to a system that performs the operations. This system of the method 600 includes one or more processors, memory, and/or other component(s) of computing device(s) (e.g., client device 110 of FIG. 1, client device 810 of FIGS. 8A-8C, and/or computing device 910 of FIG. 9, one or more servers, and/or other computing devices). Moreover, while operations of the method 600 are shown in a particular order, this is not meant to be limiting. One or more operations may be reordered, omitted, and/or added.

At block 652, the system receives, from a third-party, a third-party dataset. As noted above with respect to block 352 of the method of 300 of FIG. 3, the third-party dataset can include any natural language content that may be utilized to fine-tune a LLM, such as data from webpages (e.g., public domain webpages, licensed webpages, non-public domain webpages, and/or other webpages), electronic books (e.g., public domain electronic books and/or non-public domain electronic books), electronic documents (e.g., electronic word processing documents, electronic PDFs, etc.), electronic communications (e.g., electronic mail, SMS messages, social media posts or messages), software code (e.g., public domain software code, licensed software code, and/or non-public domain software code), electronic news articles, mathematical formulas, machine translation data, and/or any other data from any other source that can be utilized to train and/or fine-tune the LLM. In some implementations, the third-party dataset may be an access-restricted dataset. In some implementations, the size of the third-party dataset may be limited to that of a particular size (e.g., one terabyte, 10 terabytes, etc.).

At block 654, the system fine-tunes, based on the third-party dataset, a LLM that was initially trained on a LLM dataset. The system can fine-tune the LLM that was initially trained on the LLM dataset and based on the third-party dataset using any suitable fine-tuning technique. Further, the system can also pre-process the third-party dataset in the same or similar described with respect to the method 300 of FIG. 3 to generate a given 3P dataset index database (e.g., of the 3P dataset index(s) database(s) 180B) that is specific to the third-party that provided the third-party dataset. This not only enables the system to subsequently determine whether a given NL based summary segment of a NL based summary matches a LLM dataset segment of the LLM dataset that was utilized to initially train the LLM, but also enables the system to subsequently determine whether a given NL based summary segment of a NL based summary matches a third-party dataset segment of the third-party dataset that was utilized to fine-tune the LLM. In implementations where multiple third-parties provide respective third-party datasets, the system can fine-tune respective instances of the LLM. This enables the third-parties to effectively leverage a respective LLM that has been fine-tuned on the respective third-party datasets.

At block 656, the system receives NL based input associated with a client device of the third-party. The NL based input can be, for example, any NL based input described above with respect to the operations of block 252 of the method 200 of FIG. 2. In some implementations, the system may also receive a third-party token that is specific to the third-party. In these implementations, the system may only be able to access the given 3P dataset index database generated based on the pre-processing of the third-party dataset in the same or similar described with respect to the method 300 of FIG. 3 in response to receiving the third-party token, thereby increasing security of the third-party dataset.

At block 658, the system generates, based on processing the NL based input using the LLM that initially trained on the LLM dataset and that was fine-tuned on the third-party dataset, a NL based summary that is responsive to the NL based input. The NL based input can be, for example, generated in the same or similar manner described above with respect to the operations of block 254 of the method 200 of FIG. 2. However, the LLM that is utilized in generating the NL based summary is specific to the third-party in that it was fine-tuned on the third-party dataset.

At block 660, the system processes the NL based summary to determine whether a NL based summary segment of the NL based summary matches: (1) a LLM dataset segment of the LLM dataset that was utilized to initially train the LLM, or (2) a third-party dataset segment of the third-party dataset that was utilized to fine-tune the LLM. The system can process the NL based summary in the same or similar described with respect to the method 400 of FIG. 4 to determine whether a NL based summary segment of the NL based summary matches: (1) a LLM dataset segment of the LLM dataset that was utilized to initially train the LLM, or (2) a third-party dataset segment of the third-party dataset that was utilized to fine-tune the LLM. However, rather than just considering whether the NL based summary segment of the NL based summary matches the LLM dataset segment of the LLM dataset that was utilized to initially train the LLM, the system can also consider whether LLM dataset segment of the LLM dataset that was utilized to initially train the LLM third-party dataset segment of the third-party dataset that was utilized to fine-tune the LLM. In some implementations, the system may limit this processing to just the LLM dataset segment of the LLM dataset that was utilized to initially train the LLM or just the third-party dataset segment of the third-party dataset that was utilized to fine-tune the LLM. Accordingly, the third-party is provided with flexibility in how the NL based summary should be processed by the system.

At block 662, the system determines whether a NL based summary segment of the NL based summary matches: (1) a LLM dataset segment of the LLM dataset that was utilized to initially train the LLM, or (2) a third-party dataset segment of the third-party dataset that was utilized to fine-tune the LLM. The system can perform the operations of block 662 in the same or similar manner described above with respect to the operations of block 258 of the method 200 of FIG. 2. However, and as noted immediately above, rather than just considering whether the NL based summary segment of the NL based summary matches the LLM dataset segment of the LLM dataset that was utilized to initially train the LLM, the system can also consider whether LLM dataset segment of the LLM dataset that was utilized to initially train the LLM third-party dataset segment of the third-party dataset that was utilized to fine-tune the LLM.

If, at an iteration of block 662, the system determines that a NL based summary segment of the NL based summary matches: (1) a LLM dataset segment of the LLM dataset that was utilized to initially train the LLM, or (2) a third-party dataset segment of the third-party dataset that was utilized to fine-tune the LLM, then the system proceeds to block 664. At block 664, the system determines whether to modify the NL based summary on behalf of the third-party or to provide an indication of the match to the third-party without modifying the NL based summary. Put another way, in implementations where the system provides these techniques as a service to a third-party, the third-party can specify whether or not to actually modify the NL based summary on behalf of the third-party or to simply provide an indication of the match to the client device.

If, at an iteration of block 664, the system determines to modify the NL based summary, then the system proceeds to block 666. At block 666, the system modifies the NL based summary to generate a modified NL based summary. At block 668, the system causes the modified NL based summary to be rendered at the client device. In various implementations, the system can modify the NL based summary in different manners based on source(s) that are associated with content captured in the NL based summary segment of the NL based summary that matches (1) the LLM dataset segment of the LLM dataset that was utilized to initially train the LLM, or (2) the third-party dataset segment of the third-party dataset that was utilized to fine-tune the LLM (e.g., using the modification engine 160 and as described with respect to the method 500 of FIG. 5). Put another way, the system can modify the NL based summary to include proper attributions when appropriate (e.g., using the rule(s) stored in the rules database 160A and/or the 3P rule(s) database(s) 180C).

If, at an iteration of block 664, the system determines not to modify the NL based summary, then the system proceeds to block 670. At block 670, the system causes an indication of the match to be rendered at the client device. Put another way, if the third-party provided information to the system that indicates the third-party does not want the system to modify the NL based summary, the system can still provide proper attributions when appropriate without actually modifying the NL based summary.

If, at an iteration of block 662, the system determines that a NL based summary segment of the NL based summary does not match: (1) a LLM dataset segment of the LLM dataset that was utilized to initially train the LLM, or (2) a third-party dataset segment of the third-party dataset that was utilized to fine-tune the LLM, then the system proceeds to block 672. At block 672, the system causes the NL based summary to be rendered at the client device. Put another way, the system need not modify the NL based summary to include proper attributions when not appropriate.

Although the method 600 of FIG. 6 is described with respect to providing a particular service to the third-party, it should be understood that is for the sake of example and is not meant to be limiting. For example, the system can provide varying degrees of services to the third-party (e.g., as described with respect to FIG. 7).

Turning now to FIG. 7, a flowchart illustrating an example method 700 of determining whether to modify a NL based summary generated by a third-party using a LLM fine-tuned by the third-party and on behalf of the third-party is depicted. For convenience, the operations of the method 700 are described with reference to a system that performs the operations. This system of the method 700 includes one or more processors, memory, and/or other component(s) of computing device(s) (e.g., client device 110 of FIG. 1, client device 810 of FIGS. 8A-8C, and/or computing device 910 of FIG. 9, one or more servers, and/or other computing devices). Moreover, while operations of the method 700 are shown in a particular order, this is not meant to be limiting. One or more operations may be reordered, omitted, and/or added.

At block 752, the system receives, from a third-party, a third-party dataset that was utilized by the third-party to fine-tune a LLM that was initially trained on a LLM dataset. Put another way, in the method 700 of FIG. 7, the third-party can fine-tune the LLM based on the third-party dataset rather than having the system fine-tune the LLM on behalf of the third-party. Nonetheless, the third-party can still provide the third-party dataset that was utilized by the third-party to fine-tune the LLM to the system. This enables the system to pre-process the third-party dataset in the same or similar described with respect to the method 300 of FIG. 3 to generate a given 3P dataset index database (e.g., of the 3P dataset index(s) database(s) 180B) that is specific to the third-party that provided the third-party dataset.

At block 754, the system receives, from the third-party, a NL based summary that was generated by the third-party and based on processing NL based input associated with a client device of the third-party and using the LLM that was initially trained on the LLM dataset and that was fine-tuned on the third-party dataset. Put another way, in the method 700 of FIG. 7, the third-party can actually generate the NL based summary rather than having the system generate the NL based summary on behalf of the third-party. However, the system may still subsequently process the NL based summary for attribution purposes. In some implementations, the system may also receive a third-party token that is specific to the third-party. In these implementations, the system may only be able to access the given 3P dataset index database generated based on the pre-processing of the third-party dataset in the same or similar described with respect to the method 300 of FIG. 3 in response to receiving the third-party token, thereby increasing security of the third-party dataset.

At block 756, the system processes the NL based summary to determine whether a NL based summary segment of the NL based summary matches: (1) a LLM dataset segment of the LLM dataset that was utilized to initially train the LLM, or (2) a third-party dataset segment of the third-party dataset that was utilized to fine-tune the LLM. The operations of block 756 can be performed in the same or similar manner described with respect to the operations of block 660 of the method 600 of FIG. 6.

At block 758, the system determines whether a NL based summary segment of the NL based summary matches: (1) a LLM dataset segment of the LLM dataset that was utilized to initially train the LLM, or (2) a third-party dataset segment of the third-party dataset that was utilized to fine-tune the LLM. The operations of block 758 can be performed in the same or similar manner described with respect to the operations of block 662 of the method 600 of FIG. 6.

If, at an iteration of block 758, the system determines that a NL based summary segment of the NL based summary matches: (1) a LLM dataset segment of the LLM dataset that was utilized to initially train the LLM, or (2) a third-party dataset segment of the third-party dataset that was utilized to fine-tune the LLM, then the system proceeds to block 760. At block 760, the system determines whether to modify the NL based summary on behalf of the third-party or to provide an indication of the match to the third-party without modifying the NL based summary. The operations of block 760 can be performed in the same or similar manner described with respect to the operations of block 664 of the method 600 of FIG. 6.

If, at an iteration of block 760, the system determines to modify the NL based summary, then the system proceeds to block 762. At block 762, the system modifies the NL based summary to generate a modified NL based summary. At block 764, the system causes the modified NL based summary to be rendered at the client device. The operations of blocks 762 and 764 can be performed in the same or similar manner described with respect to the operations of blocks 666 and 668, respectively, of the method 600 of FIG. 6.

If, at an iteration of block 760, the system determines not to modify the NL based summary, then the system proceeds to block 766. At block 766, the system causes an indication of the match to be rendered at the client device. The operations of blocks 766 can be performed in the same or similar manner described with respect to the operations of block 670 of the method 600 of FIG. 6.

If, at an iteration of block 758, the system determines that a NL based summary segment of the NL based summary does not match: (1) a LLM dataset segment of the LLM dataset that was utilized to initially train the LLM, or (2) a third-party dataset segment of the third-party dataset that was utilized to fine-tune the LLM, then the system proceeds to block 768. At block 768, the system causes the NL based summary to be rendered at the client device. The operations of blocks 768 can be performed in the same or similar manner described with respect to the operations of block 672 of the method 600 of FIG. 6.

Although the method 600 of FIG. 6 and the method 700 of FIG. 7 depict particular services that the system can provide to the third-party, it should be understood that these services are provided for the sake of example and are not meant to be limiting. Rather, it should be understood that the third-party can specify various functions it would like the system to perform as services and on behalf of the third-party.

Figure 8A:
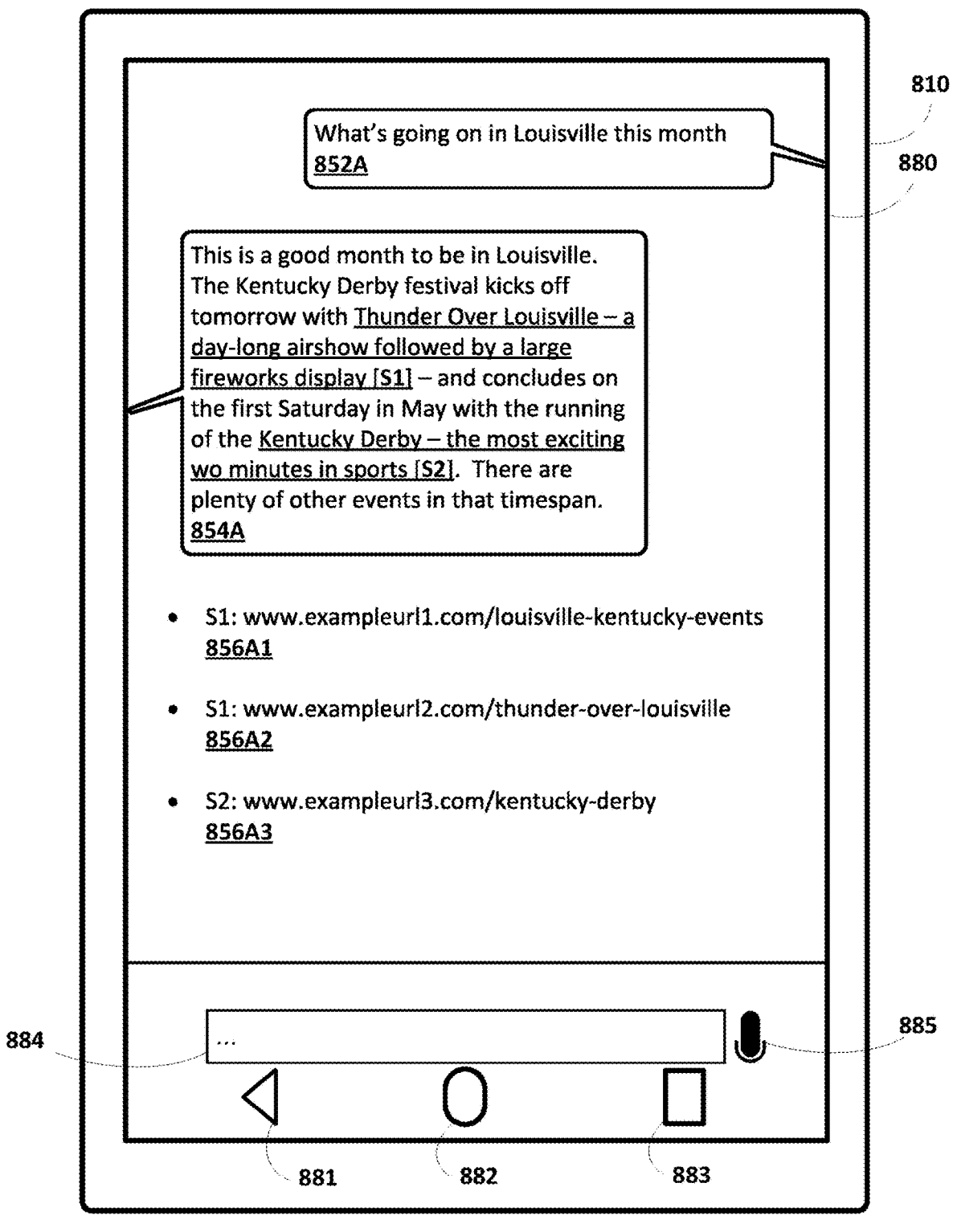
FIG. 8A, FIG. 8B, and FIG. 8C depict various non-limiting examples of a client device rendering a graphical interface that includes a respective modified NL based summary that is initially generated using a LLM and subsequently modified for attribution, in accordance with various implementations.
Figure 8B:
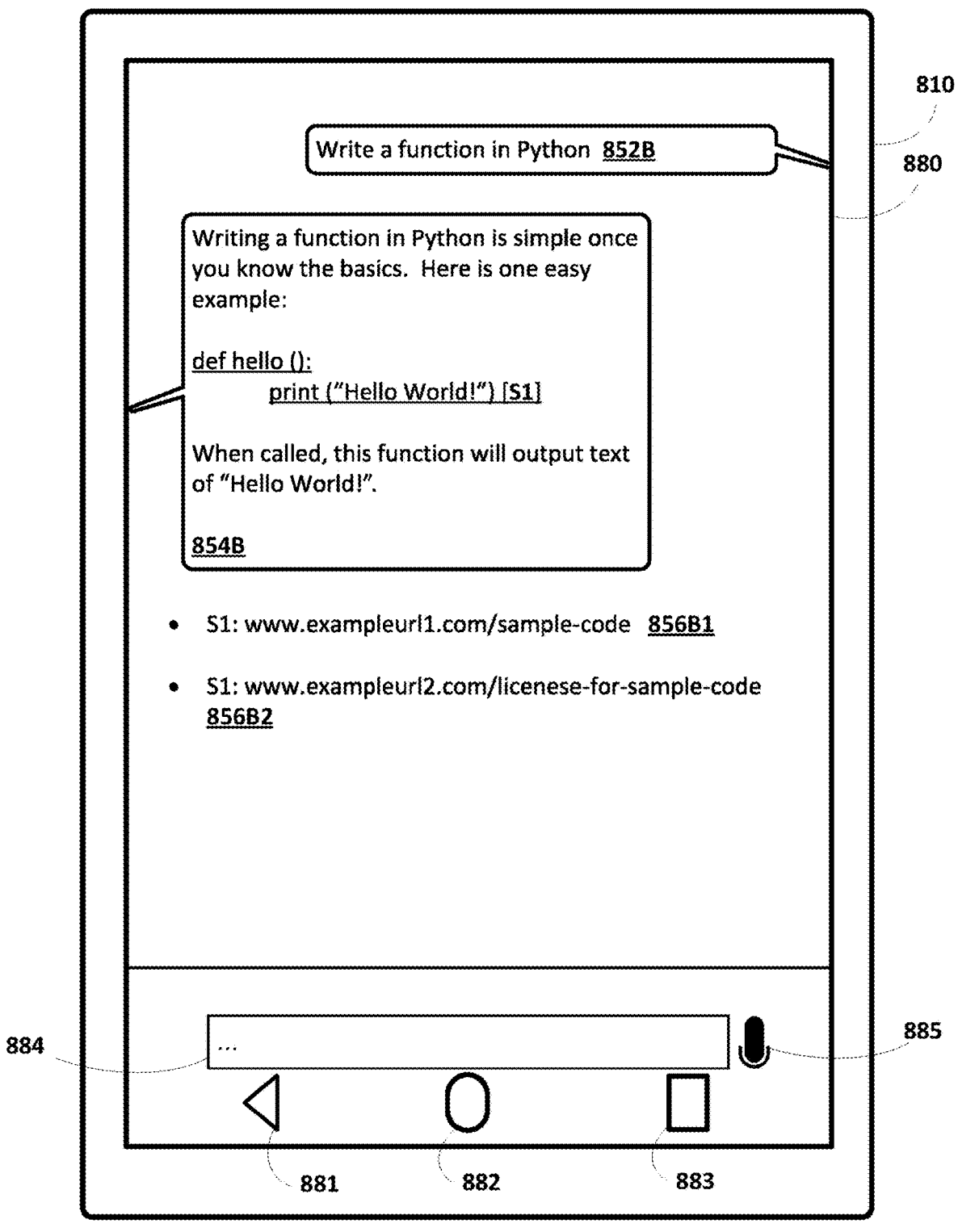
Figure 8C:
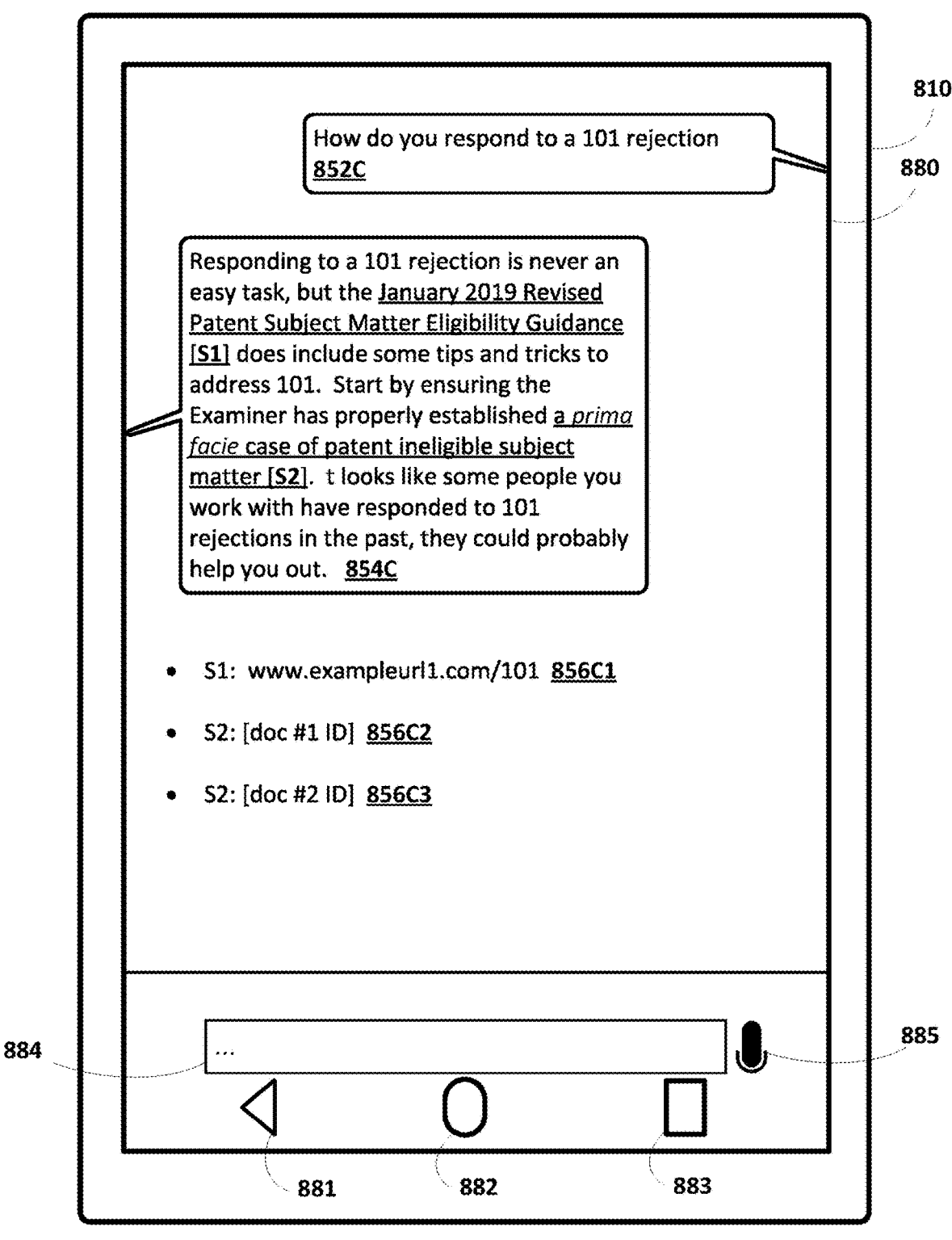

Turning now to FIGS. 8A-8C, various non-limiting examples of a client device rendering a graphical interface that includes a respective modified NL based summary that is initially generated using a LLM and subsequently modified for attribution are depicted. A client device 810 (e.g., an instance of the client device 110 of FIG. 1) may include various user interface components including, for example, microphone(s) to generate audio data based on spoken utterances and/or other audible input, speaker(s) to audibly render synthesized speech and/or other audible output, and/or a display 880 to visually render visual output. Further, the display 880 of the client device 810 can include various system interface elements 881, 882, and 883 (e.g., hardware and/or software interface elements) that may be interacted with by a user of the client device 810 to cause the client device 810 to perform one or more actions. The display 880 of the client device 810 enables the user to interact with content rendered on the display 880 by touch input (e.g., by directing user input to the display 880 or portions thereof (e.g., to a text entry box 884, to a keyboard (not depicted), or to other portions of the display 880)) and/or by spoken input (e.g., by selecting microphone interface element 885— or just by speaking without necessarily selecting the microphone interface element 885 (i.e., an automated assistant may monitor for one or more terms or phrases, gesture(s) gaze(s), mouth movement(s), lip movement(s), and/or other conditions to activate spoken input) at the client device 810). Although the client device 810 depicted in FIGS. 8A-8C is a mobile phone, it should be understood that is for the sake of example and is not meant to be limiting. For example, the client device 810 may be a standalone speaker with a display, a standalone speaker without a display, a home automation device, an in-vehicle system, a laptop, a desktop computer, and/or any other device capable of executing an automated assistant to engage in a human-to-computer dialog session with the user of the client device 810.

Referring specifically to FIG. 8A, assume that a user of the client device 810 provides NL based input 852A of "What's going on in Louisville this month". Further assume that, in response to the user providing the NL based input 852A, a modified NL based summary 854A is visually rendered at the display 880 of the client device 810. In the example of FIG. 8A, the modified NL based summary 854A that is visually rendered at the display 880 of the client device 810 includes multiple attributions that are included in the modified NL based summary 854A based on processing a NL based summary and determining that corresponding NL based summary segments of the NL based summary match corresponding LLM dataset segment of an LLM dataset that was utilized to initially train an LLM utilized in generating the NL based summary (e.g., according to the method 200 of FIG. 2). For instance, assume that it is determined that a first NL based summary segment of the NL based summary includes a first fixed number of words starting at a word boundary (e.g., "Thunder" in the Example of FIG. 8A). In this instance, assume that the first fixed number of words starting at the word boundary matches content from multiple public domain webpages as indicated by the URLs at 856A1 and 856A2. As a result, one or more of the URLs at 856A1 and 856A2 can be utilized to modify the first NL based summary segment of the NL based summary, resulting in the first NL based summary segment (e.g., including the indication "[S1]" in the modified NL based summary 854A) as shown on the display 880 of the client device 810 in FIG. 8A.

Although the first NL based summary segment of the modified NL based summary 854A is depicted in FIG. 8A as including the indication "[S1]" as the modification, it should be understood that is for the sake of example and is not meant to be limiting. For example, one or more of the URLs at 856A1 and 856A2 (or a hyperlink of the URLs) can be directly included in the first NL based summary segment of the modified NL based summary 854A. Further, although the first NL based summary segment of the modified NL based summary 854A is depicted in FIG. 8A as including both the URLs at 856A1 and 856A2, it should be understood that is also for the sake of example and is not meant to be limiting. For example, only one of the URLs 856A1 and 856A2 can be included as the source of the content captured in the first NL based summary segment. For instance, a given one of the URLs at 856A1 and 856A2 that is associated with an earliest publication date, or is first in alphabetical order can be the only URL presented as being the source of the first NL based summary segment of the modified NL based summary 854A. Moreover, it should be noted that multiple NL based segments are included in the modified NL based summary 854A as depicted in FIG. 8A. For instance, further assume that it is determined that a second NL based summary segment of the NL based summary includes a second fixed number of words starting at a word boundary (e.g., "Kentucky" in the Example of FIG. 8A). In this instance, assume that the second fixed number of words starting at the word boundary matches content from a distinct public domain webpage (e.g., distinct from the public domain webpages associated with the first NL based summary segment in the example of FIG. 8A) as indicated by the URL at 856A3. As a result, the URL 856A3 can be utilized to modify the second NL based summary segment of the NL based summary, resulting in the second NL based summary segment (e.g., including the indication "[S2]" in the modified NL based summary 854A) as shown on the display 880 of the client device 810 in FIG. 8A.

Referring specifically to FIG. 8B, assume that a user of the client device 810 provides NL based input 852B of "Write a function in Python". Further assume that, in response to the user providing the NL based input 852B, a modified NL based summary 854B is visually rendered at the display 880 of the client device 810. In the example of FIG. 8B, the modified NL based summary 854B that is visually rendered at the display 880 of the client device 810 includes an attribution that is included in the modified NL based summary 854B based on processing a NL based summary and determining that a NL based summary segment of the NL based summary match a LLM dataset segment of an LLM dataset that was utilized to initially train an LLM utilized in generating the NL based summary (e.g., according to the method 200 of FIG. 2). For instance, assume that it is determined that the NL based summary segment of the NL based summary includes a fixed number of words starting at a word boundary (e.g., "def" in the Example of FIG. 8B). In this instance, assume that the fixed number of words starting at the word boundary matches content from licensed software code as indicated by the URLs at 856B1 and 856B2. As a result, the URLs at 856B1 and 856B2 can be utilized to modify the NL based summary segment of the NL based summary, resulting in the NL based summary segment (e.g., including the indication "[S1]" in the in the modified NL based summary 854B) as shown on the display 880 of the client device 810 in FIG. 8B.

Notably, and in contrast with the example of FIG. 8A, in the example of FIG. 8B, the source of the content captured in the NL based summary segment of the modified NL based summary 854B corresponds to licensed software code. Accordingly, the URL at 856B1 may be a URL to the licensed software code, while the URL at 856B2 may be a URL to the actual license for the licensed software code. Although the NL based summary segment of the modified NL based summary 854B is depicted in FIG. 8B as including the indication "[S1]" as the modification, it should be understood that is for the sake of example and is not meant to be limiting. For example, one or more of the URLs at

856B1 and 856B2 (or a hyperlink of the URLs) can be directly included in the NL based summary segment of the modified NL based summary 854B.

Referring specifically to FIG. 8C, assume that a user of the client device 810 provides NL based input 852C of "How do you respond to a 101 rejection". Further assume that, in response to the user providing the NL based input 852C, a modified NL based summary 854C is visually rendered at the display 880 of the client device 810. In the example of FIG. 8C, the modified NL based summary 854C that is visually rendered at the display 880 of the client device 810 includes an attribution that is included in the modified NL based summary 854C based on processing a NL based summary and determining that a first NL based summary segment of the NL based summary matches a LLM dataset segment of an LLM dataset that was utilized to initially train an LLM utilized in generating the NL based summary (e.g., according to the method 200 of FIG. 2). For instance, assume that it is determined that a first NL based summary segment of the NL based summary includes a first fixed number of words starting at a word boundary (e.g., "January" in the example of FIG. 8C). In this instance, assume that the first fixed number of words starting at the word boundary matches content from a public webpage as indicated by the URL at 856C1. As a result, the URL at 856C1 can be utilized to modify the first NL based summary segment of the NL based summary, resulting in the first NL based summary segment (e.g., including the indication "[S1]" in the modified NL based summary 854C) as shown on the display 880 of the client device 810 in FIG. 8C.

However, in contrast with the example of FIGS. 8A and 8B, further assume that the LLM utilized in generating the NL based summary was fine-tuned based on a third-party dataset provided by a third-party law firm, and that the user of the client device 810 is associated with the third-party. Accordingly, in the example of FIG. 8C, the modified NL based summary 854C that is visually rendered at the display 880 of the client device 810 includes additional attributions that are included in the modified NL based summary 854C based on processing the NL based summary and determining that a second NL based summary segment of the NL based summary matches a third-party dataset segment of third-party dataset that was utilized to fine-tune the LLM utilized in generating the NL based summary (e.g., according to the method 600 of FIG. 6 or the method 700 of FIG. 7). For instance, further assume that it is determined that a second NL based summary segment of the NL based summary includes a second fixed number of words starting at a word boundary (e.g., "a" in the example of FIG. 8C). In this instance, assume that the second fixed number of words starting at the word boundary matches content from multiple Office Action responses of the third-party law firm as indicated by the document identifiers at 856C2 and 856C2. As a result, the document identifiers at 856C2 and 856C3 can be utilized to modify the second NL based summary segment of the NL based summary, resulting in the second NL based summary segment (e.g., including the indication "[S2]" in the modified NL based summary 854C) as shown on the display 880 of the client device 810 in FIG. 8C. This enables the user associated with the third-party to quickly and efficiently identify pertinent documents of the third-party that are related to the NL based input 852C initially provided by the user of the client device 810.

Although the first NL based summary segment of the modified NL based summary 854C and the second NL based summary segment of the modified NL based summary 854C are depicted in FIG. 8C as including the indication "[S1]" and "[S2]", respectively, as the modifications, it should be understood that is for the sake of example and is not meant to be limiting. For example, the URL at 856C1 and/or one or more of the document identifiers at 856C2 and 856C3 (or a hyperlink thereto) can be directly included in the respective NL based summary segments of the modified NL based summary 854C. As another example, the user can provide further NL based input to request that electronic documents associated with one or more of the document identifiers at 856C2 and 856C3 be rendered for presentation to the user. Further, although the second NL based summary segment of the modified NL based summary 854C is depicted in FIG. 8C as including both the document identifiers at 856C2 and 856C3, it should be understood that is also for the sake of example and is not meant to be limiting. For example, only one of the document identifiers 856C2 and 856C3 can be included as the source of the second NL based summary segment. For instance, a given one of the document identifiers at 856C2 and 856C3 that is associated with a particular author, that a patent Examiner found persuasive can be the only document identifier presented as being the source of the second NL based summary segment of the modified NL based summary 854C, and/or based on other rules for how to modify the second NL based summary segment in response to determining that it matches the third-party dataset segment. Notably, how the second NL based summary segment of the modified NL based summary 854C is modified may be dependent on any 3P rule(s) provided by the third-party (e.g., stored in the 3P rule(s) database(s) 180C that is specific to the third-party).

Figure 9:
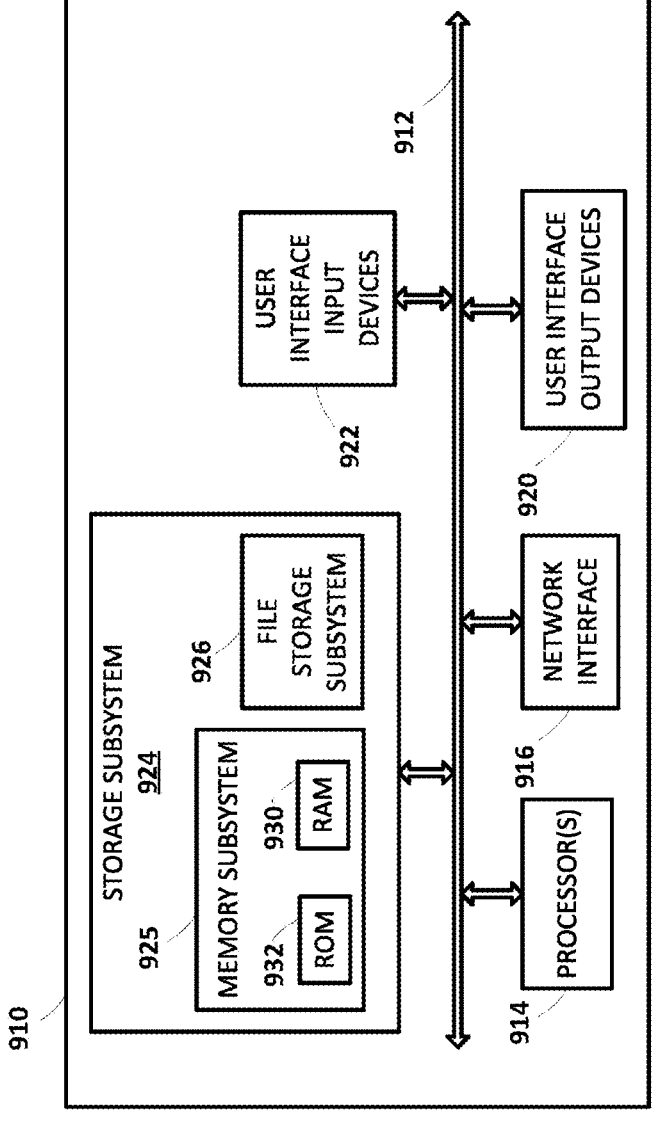
FIG. 9 depicts an example architecture of a computing device, in accordance with various implementations.

Turning now to FIG. 9, a block diagram of an example computing device 910 that may optionally be utilized to perform one or more aspects of techniques described herein is depicted. In some implementations, one or more of a client device, cloud-based automated assistant component(s), and/ or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the methods disclosed herein, as well as to implement various components depicted in FIG. 1.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem 912 may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving natural language (NL) based input associated with a client device; generating, based on processing the NL based input using a large language model (LLM) that was initially trained on a LLM dataset, a NL based summary that is responsive to the NL based input; processing the NL based summary to determine whether a NL based summary segment of the NL based summary matches a LLM dataset segment of the LLM dataset that was utilized to initially train the LLM; in response to determining that a NL based summary segment of the NL based summary matches a LLM dataset segment of the LLM dataset that was utilized to initially train the LLM: modifying the NL based summary segment of the NL based summary to generate a modified NL based summary that is also responsive to the NL based input; and causing the modified NL based summary that is responsive to the NL based input to be rendered at the client device.

These and other implementations of technology disclosed herein can optionally include one or more of the following features.

In some implementations, the method can further include, prior to processing the NL based summary to determine whether the NL based summary segment of the NL based summary matches the LLM dataset segment of the LLM dataset that was utilized to initially train the LLM: normalizing, using one or more normalization operations, the LLM dataset that was utilized to initially train the LLM to generate a normalized LLM dataset; segmenting the normalized LLM dataset into a plurality of LLM dataset alphanumeric segments; and storing the plurality of LLM dataset alphanumeric segments in an index.

In some versions of these implementations, the one or more normalization operations can include one or more of: converting all capitalized alphanumeric characters in the LLM dataset into lowercase alphanumeric characters; converting all punctuation in the LLM dataset into single spaces; or converting all white spaces in the LLM dataset into single spaces.

In additional or alternative versions of these implementations, segmenting the normalized LLM dataset into the plurality of LLM dataset alphanumeric segments can include: identifying, in the normalized LLM dataset, a plurality of LLM dataset word boundaries; and at each LLM dataset word boundary of the plurality of LLM dataset word boundaries: identifying a given LLM dataset alphanumeric segment of the plurality of LLM dataset alphanumeric segments; and storing the given LLM dataset alphanumeric segment in the index.

In some further versions of these additional or alternative implementations, each of the plurality of LLM dataset alphanumeric segments can include a fixed number of alphanumeric characters starting at a corresponding one of the plurality of LLM dataset word boundaries or a fixed number of words starting at a corresponding one of the plurality of LLM dataset word boundaries.

In yet further versions of these additional or alternative implementations, the fixed number of alphanumeric characters starting from the corresponding one of the plurality of LLM dataset word boundaries or the fixed number of words starting from the corresponding one of the plurality of LLM dataset word boundaries can be a tunable parameter.

In additional or alternative versions of these implementations, the method can further include, for each of the plurality of LLM dataset alphanumeric segments: storing, in association with each of the plurality of LLM dataset alphanumeric segments in the index, corresponding metadata that indicates one or more corresponding sources of the LLM dataset captured in each of the plurality of LLM dataset alphanumeric segments.

In additional or alternative versions of these implementations, the method can further include, prior to processing the NL based summary to determine whether the NL based summary segment of the NL based summary matches the LLM dataset segment of the LLM dataset that was utilized to initially train the LLM: normalizing, using one or more normalization operations, the NL based summary to generate a normalized NL based summary; and segmenting the normalized NL based summary into a plurality of NL based summary alphanumeric segments.

In some further versions of these additional or alternative implementations, the one or more normalization operations can include one or more of: converting all capitalized alphanumeric characters in the NL based summary into lowercase alphanumeric characters; converting all punctuation in the NL based summary into single spaces; or converting all white spaces in the NL based summary into single spaces.

In some further versions of these additional or alternative implementations, segmenting the normalized NL based summary into the plurality of NL based summary alphanumeric segments can include: identifying, in the normalized NL based summary, a plurality of NL based summary word boundaries; and at each NL based summary word boundary of the plurality of NL based summary word boundaries: identifying a given NL based summary alphanumeric segment of the plurality of NL based summary alphanumeric segments.

In yet further versions of these additional or alternative implementations, each of the plurality of NL based summary alphanumeric segments can include a fixed number of alphanumeric characters starting from a corresponding one of the plurality of NL based summary word boundaries or a fixed number of words starting from a corresponding one of the plurality of NL based summary word boundaries.

In even yet further versions of these additional or alternative implementations, the fixed number of alphanumeric characters starting from the corresponding one of the plurality of NL based summary word boundaries or the fixed number of words starting from the corresponding one of the plurality of NL based summary word boundaries can be a tunable parameter.

In some further versions of these additional or alternative implementations, processing the NL based summary to determine whether the NL based summary segment of the NL based summary matches the LLM dataset segment of the LLM dataset that was utilized to initially train the LLM can include: comparing each of the plurality of NL based summary alphanumeric segments to each of the plurality of LLM dataset alphanumeric segments stored in the index to determine whether the NL based summary segment of the NL based summary matches the LLM dataset segment of the LLM dataset that was utilized to initially train the LLM.

In yet further versions of these additional or alternative implementations, determining that a NL based summary segment of the NL based summary matches a LLM dataset segment of the LLM dataset that was utilized to initially train the LLM can include: determining that given NL based summary alphanumeric characters, of a given NL based summary alphanumeric segment from among the plurality of NL based summary alphanumeric segments, match given LLM dataset alphanumeric characters, of a given LLM dataset alphanumeric segment from among the plurality of LLM dataset alphanumeric segments.

In some yet further versions of these additional or alternative implementations, comparing each of the plurality of NL based summary alphanumeric segments to each of the plurality of LLM dataset alphanumeric segments stored in the index can include using one or more of: a low-latency key value storage technique, or an index sharding technique.

In some implementations, generating the NL based summary that is responsive to the NL based input based on processing the NL based input using the LLM that was initially trained on the LLM dataset can include: processing, using the LLM that was initially trained on the LLM dataset, the NL based input to generate LLM output; and generating, based on the LLM output, the NL based summary that is responsive to the NL based input.

In some versions of those implementations, the method can further include processing, using the LLM that was initially trained on the LLM dataset and along with the NL based input, a NL based prompt to generate the LLM output, the NL based prompt being generated based on the NL based input, but the NL based prompt being separate from the NL based input.

In some further versions of those implementations, the method can further include generating the NL based prompt based on one or more of: user attribute data associated with a user of the client device that characterizes attributes of the user, user interaction data associated with the user of the client device that characterizes recent interactions of the user with the client device, or user preference data associated with the user of the client device that characterizes preferences of the user.

In additional or alternative versions of those implementations, the method can further include obtaining, based on the NL based input, one or more search results documents that are responsive to the NL based input; and processing, using the LLM that was initially trained on the LLM dataset and along with the NL based input, the one or more search results documents that are responsive to the NL based input to generate the LLM output.

In some implementations, modifying the NL based summary segment of the NL based summary to generate the modified NL based summary that is also responsive to the NL based input can include: determining one or more corresponding sources associated with the LLM dataset segment of the LLM dataset that matches the NL based summary segment of the NL based summary; and modifying, based on the one or more corresponding sources associated with the LLM dataset segment of the LLM dataset that matches the NL based summary segment of the NL based summary to generate the modified NL based summary that is also responsive to the NL based input.

In some versions of those implementations, the one or more corresponding sources can include one or more of: a corresponding public domain webpage, a corresponding licensed webpage, a corresponding public domain book, a corresponding non-public domain book, a corresponding news article, a corresponding corpus of machine translation data, a corresponding corpus of public domain software code, or a corresponding corpus of licensed software code.

In additional or alternative versions of those implementations, each of the one or more corresponding sources can be associated with corresponding rules for how to modify the NL based summary segment of the NL based summary.

In some additional or alternative versions of those implementations, the LLM dataset segment of the LLM dataset that matches the NL based summary segment of the NL based summary can be stored in an index and in association with metadata that identifies the one or more corresponding sources.

In other additional or alternative versions of those implementations, the one or more corresponding sources can include one of: the corresponding public domain webpage, the corresponding public domain book, the corresponding news article, the corresponding corpus of machine translation data, or the corresponding corpus of public domain software code, and modifying the NL based summary segment of the NL based summary to generate the modified NL based summary that is also responsive to the NL based input can include modifying the NL based summary segment of the NL based summary to include a corresponding uniform resource locator (URL) to one or more of the corresponding sources.

In yet other additional or alternative versions of those implementations, the one or more corresponding sources can include one of: the corresponding licensed webpage or the corresponding corpus of licensed software code, and modifying the NL based summary segment of the NL based summary to generate the modified NL based summary that is also responsive to the NL based input can include modifying the NL based summary segment of the NL based summary to include a corresponding uniform resource locator (URL) to one or more of the corresponding sources and an additional corresponding URL to one or more licenses for the one or more of the corresponding sources.

In yet other additional or alternative versions of those implementations, the one or more corresponding sources can include the corresponding non-public domain book, and modifying the NL based summary segment of the NL based summary to generate the modified NL based summary that is also responsive to the NL based input can include modifying the NL based summary segment of the NL based summary to truncate a portion of the NL based summary segment of the NL based summary.

In yet other additional or alternative versions of those implementations, the one or more corresponding sources can include the corresponding non-public domain book, and modifying the NL based summary segment of the NL based summary to generate the modified NL based summary that is also responsive to the NL based input an include modifying the NL based summary segment of the NL based summary to remove the NL based summary segment of the NL based summary.

In yet other additional or alternative versions of those implementations, the one or more corresponding sources can include multiple of: the corresponding public domain webpage, the corresponding public domain book, the corresponding news article, the corresponding corpus of machine translation data, or the corresponding corpus of public domain software code. In these implementations, modifying the NL based summary segment of the NL based summary to generate the modified NL based summary that is also responsive to the NL based input can include modifying the NL based summary segment of the NL based summary to include a corresponding uniform resource locator (URL) to one or more of the corresponding sources, and the corresponding uniform resource locator (URL) to one or more of the corresponding sources can include associated with a single source having the earliest publication date from among the multiple corresponding sources.

In yet other additional or alternative versions of those implementations, the one or more corresponding sources can include multiple of: the corresponding public domain webpage, the corresponding public domain book, the corresponding news article, the corresponding corpus of machine translation data, or the corresponding corpus of public domain software code. In these implementations, modifying the NL based summary segment of the NL based summary to generate the modified NL based summary that is also responsive to the NL based input can include modifying the NL based summary segment of the NL based summary to include a corresponding uniform resource locator (URL) to one or more of the corresponding sources, and the corresponding uniform resource locator (URL) to one or more of the corresponding sources can be associated with a single source being the earliest alphabetically from among the multiple corresponding sources.

In yet other additional or alternative versions of those implementations, the one or more corresponding sources can include one of: the corresponding licensed webpage or the corresponding corpus of licensed software code, and the one or more corresponding sources can further include one of: a corresponding public domain webpage, a corresponding licensed webpage, a corresponding public domain book, a corresponding non-public domain book, a corresponding news article, a corresponding corpus of machine translation data, a corresponding corpus of public domain software code, or a corresponding corpus of licensed software code. In these implementations, modifying the NL based summary segment of the NL based summary to generate the modified NL based summary that is also responsive to the NL based input can include modifying the NL based summary segment of the NL based summary to include a corresponding uniform resource locator (URL) to one or more of the corresponding sources and an additional corresponding URL to one or more licenses for the corresponding licensed webpage or the corresponding corpus of licensed software code.

In some implementations, modifying the NL based summary segment of the NL based summary to generate the modified NL based summary that is also responsive to the NL based input can include: determining one or more corresponding sources associated with the LLM dataset segment of the LLM dataset that matches the NL based summary segment of the NL based summary; determining, based on a type of one or more of the corresponding sources associated with the LLM dataset segment of the LLM dataset that matches the NL based summary segment of the NL based summary, to generate an additional NL based summary that is also responsive to the NL based input; generating, based on processing the NL based input using the LLM that was initially trained on a LLM dataset, the additional NL based summary that is also responsive to the NL based input; processing the additional NL based summary to determine whether an additional NL based summary segment of the additional NL based summary matches the LLM dataset segment of the LLM dataset that was utilized to initially train the LLM; and in response to determining that an additional NL based summary segment of the NL based summary does not match the LLM dataset segment of the LLM dataset that was utilized to initially train the LLM: using the additional modified NL based summary that is also responsive to the NL based input as the modified NL based summary that is also responsive to the NL based input.

In some versions of those implementations, generating the additional NL based summary that is also responsive to the NL based input based on processing the NL based input using the LLM that was initially trained on a LLM dataset can include: processing, using the LLM that was initially trained on the LLM dataset, the NL based input to generate LLM output; and generating, based on the LLM output, the additional NL based summary that is responsive to the NL based input.

In some further versions of those implementations, generating the additional NL based summary that is responsive to the NL based input can include biasing away from the LLM dataset segment of the LLM dataset that was utilized to initially train the LLM.

In some implementations, modifying the NL based summary segment of the NL based summary to generate the modified NL based summary that is also responsive to the NL based input can include: determining one or more corresponding sources associated with the LLM dataset segment of the LLM dataset that matches the NL based summary segment of the NL based summary; determining, based on a type of one or more of the corresponding sources associated with the LLM dataset segment of the LLM dataset that matches the NL based summary segment of the NL based summary, to generate an additional NL based summary that is also responsive to the NL based input; generating, based on processing additional NL based input using the LLM that was initially trained on a LLM dataset, the additional NL based summary that is also responsive to the NL based input; processing the additional NL based summary to determine whether an additional NL based summary segment of the additional NL based summary matches the LLM dataset segment of the LLM dataset that was utilized to initially train the LLM; and in response to determining that an additional NL based summary segment of the NL based summary does not match the LLM dataset segment of the LLM dataset that was utilized to initially train the LLM: using the additional modified NL based summary that is also responsive to the NL based input as the modified NL based summary that is also responsive to the NL based input. In some versions of those implementations, the method can further include generating, based on the NL input and based on the NL based summary segment of the NL based summary, the additional NL based input.

In some implementations, the NL based input associated with the client device can be a query directed to the LLM, and the NL based input can be determined based on processing the query directed to the LLM. In some versions of those implementations, the query can include one or more of: a voice query, a typed query, an image-based query, a multimodal query, or a parameterless query.

In some implementations, the NL based input associated with the client device can be a prompt directed to the LLM, and the NL based input can be determined based on processing the prompt directed to the LLM.

In some implementations, causing the modified NL based summary that is responsive to the NL based input to be rendered at the client device can include causing the modified NL based summary that is responsive to the NL based input to be visually rendered via a display of the client device in a streaming manner.

In some implementations, causing the modified NL based summary that is responsive to the NL based input to be rendered at the client device can include causing the modified NL based summary that is responsive to the NL based input to be audibly rendered via a one or more speakers of the client device.

In some implementations, a method implemented by one or more processors is provided, and includes receiving, from a third-party, a third-party dataset; fine-tuning, based on the third-party dataset, a large language model (LLM) that was initially trained on a LLM dataset; receiving natural language (NL) based input associated with a client device of the third-party; generating, based on processing the NL based input using the LLM that was initially trained on the LLM dataset and that was fine-tuned on the third-party dataset, a NL based summary that is responsive to the NL based input; processing the NL based summary to determine whether a NL based summary segment of the NL based summary matches: (i) a LLM dataset segment of the LLM dataset that was utilized to initially train to the LLM, or (ii) a third-party dataset segment of the third-party dataset that was utilized to fine-tune the LLM; in response to determining that a NL based summary segment of the NL based summary matches: (i) a LLM dataset segment of the LLM dataset that was utilized to initially train to the LLM, or (ii) a third-party dataset segment of the third-party dataset that was utilized to fine-tune the LLM: modifying the NL based summary segment of the NL based summary to generate a modified NL based summary that is also responsive to the NL based input; and causing the modified NL based summary that is responsive to the NL based input to be rendered at the client device.

These and other implementations of technology disclosed herein can optionally include one or more of the following features.

In some implementations, the third-party dataset can include a corpus of access-restricted data that is specific to the third-party.

In some implementations, the method can further include, prior to processing the NL based summary to determine whether a NL based summary segment of the NL based summary matches: (i) a LLM dataset segment of the LLM dataset that was utilized to initially train to the LLM, or (ii) a third-party dataset segment of the third-party dataset that was utilized to fine-tune the LLM: normalizing, using one or more normalization operations, the third-party dataset that was utilized to fine-tune the LLM to generate a normalized third-party dataset; segmenting the normalized third-party dataset into a plurality of third-party dataset alphanumeric segments; and storing the plurality of third-party dataset alphanumeric segments in a third-party index.

In some versions of those implementations, the one or more normalization operations can include one or more of: converting all capitalized alphanumeric characters in the third-party dataset into lowercase alphanumeric characters; converting all punctuation in the third-party dataset into single spaces; or converting all white spaces in the third-party dataset into single spaces.

In additional or alternative versions of those implementations, segmenting the normalized third-party dataset into the plurality of third-party dataset alphanumeric segments can include: identifying, in the normalized third-party dataset, a plurality of third-party dataset word boundaries; and at each third-party dataset word boundary of the plurality of third-party dataset word boundaries: identifying a given third-party dataset alphanumeric segment of the plurality of third-party dataset alphanumeric segments; and storing the given third-party dataset alphanumeric segment in the third-party index.

In some additional or alternative versions of those implementations, each of the plurality of third-party dataset alphanumeric segments can include a fixed number of alphanumeric characters starting from a corresponding one of the plurality of third-party dataset word boundaries or a fixed number of words starting from a corresponding one of the plurality of third-party dataset word boundaries.

In some further additional or alternative versions of those implementations, the fixed number of alphanumeric characters starting from the corresponding one of the plurality of third-party dataset word boundaries or the fixed number of words starting from the corresponding one of the plurality of third-party dataset word boundaries can be a tunable parameter.

In some additional or alternative versions of those implementations, the method can further include, for each of the plurality of third-party dataset alphanumeric segments: storing, in association with each of the plurality of third-party dataset alphanumeric segments in the third-party index, corresponding third-party metadata that indicates one or more corresponding sources of the third-party dataset captured in each of the plurality of third-party dataset alphanumeric segments.

In some additional or alternative versions of those implementations, the method can further include receiving, from a third-party, a third-party token that is specific to the third-party and that enables access to the third-party index in response to receiving the NL based input.

In some additional or alternative versions of those implementations, processing the NL based summary to determine whether a NL based summary segment of the NL based summary matches: (i) a LLM dataset segment of the LLM dataset that was utilized to initially train to the LLM, or (ii) a third-party dataset segment of the third-party dataset that was utilized to fine-tune the LLM can include: comparing a plurality of NL based summary alphanumeric segments to each of: (iii) a plurality of LLM dataset alphanumeric segments stored in an index, and (iv) the plurality of third-party dataset alphanumeric segments stored in the third-party index, to determine whether a NL based summary segment of the NL based summary matches: (i) the LLM dataset segment of the LLM dataset that was utilized to initially train to the LLM, or (ii) the third-party dataset segment of the third-party dataset that was utilized to fine-tune the LLM.

In some further additional or alternative versions of those implementations, determining that a NL based summary segment of the NL based summary matches (i) a LLM dataset segment of the LLM dataset that was utilized to initially train to the LLM can include: determining that given NL based summary alphanumeric characters, of a given NL based summary alphanumeric segment from among the plurality of NL based summary alphanumeric segments, match given LLM dataset alphanumeric characters, of a given LLM dataset alphanumeric segment from among the plurality of LLM dataset alphanumeric segments.

In other further additional or alternative versions of those implementations, determining that a NL based summary segment of the NL based summary matches (ii) a third-party dataset segment of the third-party dataset that was utilized to fine-tune the LLM can include: determining that given NL based summary alphanumeric characters, of a given NL based summary alphanumeric segment from among the plurality of NL based summary alphanumeric segments, match given third-party dataset alphanumeric characters, of a given third-party dataset alphanumeric segment from among the plurality of third-party dataset alphanumeric segments.

In some other further additional or alternative versions of those implementations, comparing each of the plurality of NL based summary alphanumeric segments to each of: (iii) a plurality of LLM dataset alphanumeric segments stored in an index, and (iv) the plurality of third-party dataset alphanumeric segments stored in the third-party index, can include using one or more of: a low-latency key value storage technique, or an index sharding technique.

In yet other further additional or alternative versions of those implementations, processing the NL based summary to determine whether a NL based summary segment of the NL based summary matches: (i) a LLM dataset segment of the LLM dataset that was utilized to initially train to the LLM, or (ii) a third-party dataset segment of the third-party dataset that was utilized to fine-tune the LLM, can be restricted to processing the NL based summary to determine whether the NL based summary segment of the NL based summary matches: (ii) the third-party dataset segment of the third-party dataset that was utilized to fine-tune the LLM.

In some implementations, generating the NL based summary that is responsive to the NL based input based on processing the NL based input using the LLM that was initially trained on the LLM dataset and that was fine-tuned on the third-party dataset can include: processing, using the LLM that was initially trained on the LLM dataset and that was fine-tuned on the third-party dataset, the NL based input to generate LLM output; and generating, based on the LLM output, the NL based summary that is responsive to the NL based input.

In some versions of those implementations, the method can further include processing, using the LLM that was initially trained on the LLM dataset and that was fine-tuned on the third-party dataset, and along with the NL based input, additional third-party data received from the third-party to prime the LLM prior to generating the NL based summary that is responsive to the NL based input.

In some further versions of those implementations, the additional third-party data received from the third-party that it utilized to prime the LLM prior to generating the NL based summary that is responsive to the NL based input can include: recently accessed third-party documents or recently contacted third-party contacts.

In some implementations, modifying the NL based summary segment of the NL based summary to generate the modified NL based summary that is also responsive to the NL based input can include: determining one or more corresponding sources associated with (i) the LLM dataset segment of the LLM dataset that was utilized to initially train to the LLM, or (ii) the third-party dataset segment of the third-party dataset that was utilized to fine-tune the LLM, that matches the NL based summary segment of the NL based summary; and modifying, based on the one or more corresponding sources associated with (i) the LLM dataset segment of the LLM dataset that was utilized to initially train to the LLM, or (ii) the third-party dataset segment of the third-party dataset that was utilized to fine-tune the LLM, that matches the NL based summary segment of the NL based summary to generate the modified NL based summary that is also responsive to the NL based input.

In some versions of those implementations, each of the one or more corresponding sources can be associated with corresponding rules for how to modify the NL based summary segment of the NL based summary, and the third-party can provide the corresponding rules for to how to modify the NL based summary segment of the NL based summary matches (ii) the third-party dataset segment of the third-party dataset that was utilized to fine-tune the LLM.

In additional or alternative versions of those implementations, the NL based summary segment of the NL based summary can match (ii) the third-party dataset segment of the third-party dataset that was utilized to fine-tune the LLM, and the modified NL based summary that is also responsive to the NL based input can include a corresponding link to one or more third-party documents that were included in the third-party dataset.

In some implementations, a method implemented by one or more processors is provided, and includes receiving, from a third-party, a third-party dataset; fine-tuning, based on the third-party dataset, a large language model (LLM) that was initially trained on a LLM dataset; receiving natural language (NL) based input associated with a client device of the third-party; generating, based on processing the NL based input using the LLM that was initially trained on the LLM dataset and that was fine-tuned on the third-party dataset, a NL based summary that is responsive to the NL based input; processing the NL based summary to determine whether a NL based summary segment of the NL based summary matches: (i) a LLM dataset segment of the LLM dataset that was utilized to initially train to the LLM, or (ii) a third-party dataset segment of the third-party dataset that was utilized to fine-tune the LLM; and in response to determining that a NL based summary segment of the NL based summary matches: (i) a LLM dataset segment of the LLM dataset that was utilized to initially train to the LLM, or (ii) a third-party dataset segment of the third-party dataset that was utilized to fine-tune the LLM: causing, to be rendered at the client device: an indication of the NL based summary segment of the NL based summary matches: (i) the LLM dataset segment of the LLM dataset that was utilized to initially train to the LLM, or (ii) the third-party dataset segment of the third-party dataset that was utilized to fine-tune the LLM; and an indication of: (i) the LLM dataset segment of the LLM dataset that was utilized to initially train to the LLM, or (ii) the third-party dataset segment of the third-party dataset that was utilized to fine-tune the LLM.

In some implementations, a method implemented by one or more processors is provided, and includes receiving, from a third-party, a third-party dataset that was utilized by the third-party to fine-tune a large language model (LLM) that was initially trained on a LLM dataset; receiving, from the third-party, a third-party natural language (NL) based summary that was generated by the third-party and based on processing NL based input associated with a client device of the third-party and using the LLM that was initially trained on the LLM dataset and that was fine-tuned on the third-party dataset; processing the third-party NL based summary to determine whether a third-party NL based summary segment of the third-party NL based summary matches: (i) a LLM dataset segment of the LLM dataset that was utilized to initially train to the LLM, or (ii) a third-party dataset segment of the third-party dataset that was utilized to fine-tune the LLM; and in response to determining that a NL based summary segment of the NL based summary matches: (i) a LLM dataset segment of the LLM dataset that was utilized to initially train to the LLM, or (ii) a third-party dataset segment of the third-party dataset that was utilized to fine-tune the LLM: causing, to be rendered at the client device: an indication of the NL based summary segment of the NL based summary matches: (i) the LLM dataset segment of the LLM dataset that was utilized to initially train to the LLM, or (ii) the third-party dataset segment of the third-party dataset that was utilized to fine-tune the LLM; and an indication of: (i) the LLM dataset segment of the LLM dataset that was utilized to initially train to the LLM, or (ii) the third-party dataset segment of the third-party dataset that was utilized to fine-tune the LLM.

In some implementations, a method implemented by one or more processors is provided, and includes receiving, from a third-party, a third-party dataset that was utilized by the third-party to fine-tune a large language model (LLM) that was initially trained on a LLM dataset; receiving, from the third-party, a third-party natural language (NL) based summary that was generated by the third-party and based on processing NL based input associated with a client device of the third-party and using the LLM that was initially trained on the LLM dataset and that was fine-tuned on the third-party dataset; processing the third-party NL based summary to determine whether a third-party NL based summary segment of the third-party NL based summary matches: (i) a LLM dataset segment of the LLM dataset that was utilized to initially train to the LLM, or (ii) a third-party dataset segment of the third-party dataset that was utilized to fine-tune the LLM; in response to determining that a NL based summary segment of the NL based summary matches: (i) a LLM dataset segment of the LLM dataset that was utilized to initially train to the LLM, or (ii) a third-party dataset segment of the third-party dataset that was utilized to fine-tune the LLM: modifying the NL based summary segment of the NL based summary to generate a modified NL based summary that is also responsive to the NL based input; and causing the modified NL based summary that is responsive to the NL based input to be rendered at the client device.

In some implementations, a method implemented by one or more processors is provided, and includes receiving natural language (NL) based input associated with a client device; generating, based on processing the NL based input using a large language model (LLM), a NL based summary that is responsive to the NL based input; determining whether one or more conditions are satisfied with respect to the NL based summary that is responsive to the NL based input; in response to determining that the one or more conditions are satisfied with respect to the NL based summary that is responsive to the NL based input: generating, based on re-processing the NL based input using the LLM, an additional NL based summary that is also responsive to the NL based input but that differs from the NL based summary; and causing the additional NL based summary that is also responsive to the NL based input but that differs from the NL based summary to be rendered at the client device.

These and other implementations of technology disclosed herein can optionally include one or more of the following features.

In some implementations, determining whether one or more conditions are satisfied with respect to the NL based summary that is responsive to the NL based input can include: processing the NL based summary to determine whether a NL based summary segment of the NL based summary matches a LLM dataset segment of a LLM dataset that was utilized to initially train the LLM. In these implementations, determining that the one or more conditions are satisfied with respect to the NL based summary that is responsive to the NL based input can include: determining that the NL based summary segment of the NL based summary matches the LLM dataset segment of the LLM dataset that was utilized to initially train the LLM.

In some implementations, generating the NL based summary that is responsive to the NL based input based on processing the NL based input using the LLM can include: processing, using the LLM, the NL based input to generate LLM output; and generating, based on the LLM output, the NL based summary that is responsive to the NL based input.

In some versions of those implementations, generating the additional NL based summary that is also responsive to the NL based input but that differs from the NL based summary based on re-processing the NL based input using the LLM can include: prior to re-processing the NL based input using the LLM, adjusting a temperature parameter of the LLM; processing, using the LLM with the adjusted temperature parameter, the NL based input to generate additional LLM output; and generating, based on the additional LLM output, the additional NL based summary that is also responsive to the NL based input but that differs from the NL based summary.

In additional or alternative versions of those implementations, generating the additional NL based summary that is also responsive to the NL based input but that differs from the NL based summary based on re-processing the NL based input using the LLM can include: processing, using the LLM, the NL based input to generate additional LLM output; and generating, based on the additional LLM output, the additional NL based summary that is also responsive to the NL based input but that differs from the NL based summary. In these implementations, generating the additional NL based summary that is also responsive to the NL based input but that differs from the NL based summary based on the additional LLM output can include: biasing away from one or more words or phrases that were included in the NL based summary.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
   receiving, from a third-party, a third-party dataset;
   fine-tuning, based on the third-party dataset, a large language model (LLM) that was initially trained on a LLM dataset;
   receiving natural language (NL) based input associated with a client device of the third-party;
   generating, based on processing the NL based input using the LLM that was initially trained on the LLM dataset and that was fine-tuned on the third-party dataset, a NL based response that is responsive to the NL based input;
   processing the NL based response to determine whether a NL based response segment, of the NL based response, matches a third-party dataset segment, of the third-party dataset that was utilized to fine-tune the LLM, based on comparing a plurality of NL based response segments, of the NL based response, to a plurality of third-party dataset segments, of the third-party dataset that was utilized to fine-tune the LLM; and
   in response to determining that a NL based response segment of the NL based response matches a third-party dataset segment of the third-party dataset that was utilized to fine-tune the LLM:
      causing, to be rendered at the client device:
         an indication of the NL based response segment of the NL based response that matches the third-party dataset segment of the third-party dataset that was utilized to fine-tune the LLM; and
         a hyperlink, included in the NL based response segment of the NL based response, to a document that includes the third-party dataset segment of the third-party dataset that was utilized to fine-tune the LLM, wherein the hyperlink, when selected, causes the client device to navigate to the document that includes the third-party dataset segment of the third-party dataset that was utilized to fine-tune the LLM.

2. The method of claim 1, wherein the third-party dataset comprises a corpus of access-restricted data that is specific to the third-party.

3. The method of claim 1, further comprising:
prior to receiving the NL based input:
storing, in association with each of the third-party dataset segments and in a third-party index, corresponding third-party metadata that indicates a corresponding document that includes one or more corresponding third-party dataset segments.

4. The method of claim 3, further comprising:
receiving, from the third-party, a third-party token that is specific to the third-party and that enables access to the third-party index in response to receiving the NL based input.

5. The method of claim 1, wherein the plurality of third-party dataset segments are stored in a third-party index.

6. The method of claim 5, wherein determining that a NL based response segment, of the NL based response, matches a third-party dataset segment, of the third-party dataset that was utilized to fine-tune the LLM, comprises:
determining that given NL based response alphanumeric characters, of a given NL based response segment, match given third-party dataset alphanumeric characters, of a given third-party dataset segment.

7. The method of claim 1, wherein processing the NL based response to determine whether a NL based response segment, of the NL based response, matches a third-party dataset segment, of the third-party dataset that was utilized to fine-tune the LLM, is restricted to processing the NL based response to determine whether the NL based response segment, of the NL based response, matches the third-party dataset segment, of the third-party dataset that was utilized to fine-tune the LLM.

8. The method of claim 1, wherein generating the NL based response that is responsive to the NL based input based on processing the NL based input using the LLM that was initially trained on the LLM dataset and that was fine-tuned on the third-party dataset comprises:
processing, using the LLM that was initially trained on the LLM dataset and that was fine-tuned on the third-party dataset, the NL based input to generate LLM output; and
generating, based on the LLM output, the NL based response that is responsive to the NL based input.

9. The method of claim 8, further comprising:
processing, using the LLM that was initially trained on the LLM dataset and that was fine-tuned on the third-party dataset, and along with the NL based input, additional third-party data received from the third-party to prime the LLM prior to generating the NL based response that is responsive to the NL based input.

10. The method of claim 9, wherein the additional third-party data received from the third-party that is utilized to prime the LLM prior to generating the NL based response that is responsive to the NL based input comprises: recently accessed third-party documents or recently contacted third-party contacts.

11. A system comprising:
at least one processor; and
memory storing instructions that, when executed by the at least one processor, cause the at least one processor to be operable to:
receive, from a third-party, a third-party dataset;
fine-tune, based on the third-party dataset, a large language model (LLM) that was initially trained on a LLM dataset;

receive natural language (NL) based input associated with a client device of the third-party;
generate, based on processing the NL based input using the LLM that was initially trained on the LLM dataset and that was fine-tuned on the third-party dataset, a NL based response that is responsive to the NL based input;
process the NL based response to determine whether a NL based response segment, of the NL based response, matches a third-party dataset segment, of the third-party dataset that was utilized to fine-tune the LLM, based on comparing a plurality of NL based response segments, of the NL based response, to a plurality of third-party dataset segments, of the third-party dataset that was utilized to fine-tune the LLM; and
in response to determining that a NL based response segment of the NL based response matches a third-party dataset segment of the third-party dataset that was utilized to fine-tune the LLM:
cause, to be rendered at the client device:
an indication of the NL based response segment of the NL based response that matches the third-party dataset segment of the third-party dataset that was utilized to fine-tune the LLM; and
a hyperlink, included in the NL based response segment of the NL based response, to a document that includes the third-party dataset segment of the third-party dataset that was utilized to fine-tune the LLM, wherein the hyperlink, when selected, causes the client device to navigate to the document that includes the third-party dataset segment of the third-party dataset that was utilized to fine-tune the LLM.

12. The system of claim 11, wherein the third-party dataset comprises a corpus of access-restricted data that is specific to the third-party.

13. The system of claim 11, wherein the instructions further cause the at least one processor to be operable to:
prior to receiving the NL based input:
store, in association with each of the third-party dataset segments and in a third-party index, corresponding third-party metadata that indicates a corresponding document that includes one or more corresponding third-party dataset segments.

14. The system of claim 13, wherein the instructions further cause the at least one processor to be operable to:
receive, from the third-party, a third-party token that is specific to the third-party and that enables access to the third-party index in response to receiving the NL based input.

15. The system of claim 11, wherein the plurality of third-party dataset segments are stored in a third-party index.

16. The system of claim 15, wherein the instructions to determine that a NL based response segment, of the NL based response, matches a third-party dataset segment, of the third-party dataset that was utilized to fine-tune the LLM, comprise instructions to:
determine that given NL based response alphanumeric characters, of a given NL based response segment, match given third-party dataset alphanumeric characters, of a given third-party dataset segment.

17. The system of claim 11, wherein processing the NL based response to determine whether a NL based response segment, of the NL based response, matches a third-party dataset segment, of the third-party dataset that was utilized to fine-tune the LLM, is restricted to processing the NL based response to determine whether the NL based response segment, of the NL based response, matches the third-party dataset segment, of the third-party dataset that was utilized to fine-tune the LLM.

18. The system of claim 11, wherein the instructions to generate the NL based response that is responsive to the NL based input based on processing the NL based input using the LLM that was initially trained on the LLM dataset and that was fine-tuned on the third-party dataset comprise instructions to:

process, using the LLM that was initially trained on the LLM dataset and that was fine-tuned on the third-party dataset, the NL based input to generate LLM output; and generate, based on the LLM output, the NL based response that is responsive to the NL based input.

19. The system of claim 18, wherein the instructions further cause the at least one processor to be operable to:

process, using the LLM that was initially trained on the LLM dataset and that was fine-tuned on the third-party dataset, and along with the NL based input, additional third-party data received from the third-party to prime the LLM prior to generating the NL based response that is responsive to the NL based input, wherein the additional third-party data received from the third-party that is utilized to prime the LLM prior to generating the NL based response that is responsive to the NL based input comprises: recently accessed third-party documents or recently contacted third-party contacts.

20. A non-transitory computer-readable storage medium storing instructions that, when executed by at least one processor, cause the at least one processor to perform operations, the operations comprising:

receiving, from a third-party, a third-party dataset;

fine-tuning, based on the third-party dataset, a large language model (LLM) that was initially trained on a LLM dataset;

receiving natural language (NL) based input associated with a client device of the third-party;

generating, based on processing the NL based input using the LLM that was initially trained on the LLM dataset and that was fine-tuned on the third-party dataset, a NL based response that is responsive to the NL based input;

processing the NL based response to determine whether a NL based response segment, of the NL based response, matches a third-party dataset segment, of the third-party dataset that was utilized to fine-tune the LLM, based on comparing a plurality of NL based response segments, of the NL based response, to a plurality of third-party dataset segments, of the third-party dataset that was utilized to fine-tune the LLM; and in response to determining that a NL based response segment of the NL based response matches a third-party dataset segment of the third-party dataset that was utilized to fine-tune the LLM:

causing, to be rendered at the client device:

an indication of the NL based response segment of the NL based response that matches the third-party dataset segment of the third-party dataset that was utilized to fine-tune the LLM; and a hyperlink, included in the NL based response segment of the NL based response, to a document that includes the third-party dataset segment of the third-party dataset that was utilized to fine-tune the LLM, wherein the hyperlink, when selected, causes the client device to navigate to the document that includes the third-party dataset segment of the third-party dataset that was utilized to fine-tune the LLM.

\*  \*  \*  \*  \*